United States Patent
Kewitsch

(10) Patent No.: US 11,579,382 B2
(45) Date of Patent: Feb. 14, 2023

(54) SYSTEM OF LARGE SCALE ROBOTIC FIBER CROSS-CONNECTS USING MULTI-FIBER TRUNK RESERVATION

(71) Applicant: TELESCENT INC., Irvine, CA (US)

(72) Inventor: Anthony Stephen Kewitsch, Santa Monica, CA (US)

(73) Assignee: TELESCENT INC., Irvine, CA (US)

( * ) Notice: Subject to any disclaimer, the term of this patent is extended or adjusted under 35 U.S.C. 154(b) by 0 days.

(21) Appl. No.: 17/501,625

(22) Filed: Oct. 14, 2021

(65) Prior Publication Data

US 2022/0107470 A1 Apr. 7, 2022

Related U.S. Application Data

(60) Division of application No. 16/378,266, filed on Apr. 8, 2019, now Pat. No. 11,187,860, which is a
(Continued)

(51) Int. Cl.
*G02B 6/40* (2006.01)
*G02B 6/38* (2006.01)
*G02B 6/35* (2006.01)

(52) U.S. Cl.
CPC ............ *G02B 6/40* (2013.01); *G02B 6/3542* (2013.01); *G02B 6/3897* (2013.01); *G02B 6/3502* (2013.01); *G02B 6/3556* (2013.01)

(58) Field of Classification Search
CPC ...... G02B 6/40; G02B 6/3542; G02B 6/3897; G02B 6/3502; G02B 6/3556
See application file for complete search history.

(56) References Cited

U.S. PATENT DOCUMENTS 6,243,510 B1 6/2001 Rauch
6,335,992 B1 1/2002 Bala et al.
(Continued)

FOREIGN PATENT DOCUMENTS

KR 10-2007-0103365 A 10/2007
WO 2018071341 A2 4/2018
(Continued)

OTHER PUBLICATIONS

USPTO, Final Rejection, dated Feb. 4, 2021 in U.S. Appl. No. 16/543,233, 11 pages.
(Continued)

*Primary Examiner* — Ellen E Kim
(74) *Attorney, Agent, or Firm* — Siritzky Law, PLLC

(57) ABSTRACT

A large scale, non-blocking fiber optic cross-connect system consists of multiple stages, including a central multifiber per connection system. The number of ports of this cross-connect system scales to over 10,000, in an incremental, modular, field expandable approach. Two separate arrays of "edge" cross-connect systems using KBS methodology are positioned on opposite sides of a central core cross-connect system, wherein the core system is comprised of switchable blocks of multi-fiber trunk lines, each terminated in a single connector that is reconfigurable by robotic means. The trunk lines between edge cross-connects are controlled by a trunk line management system to provision/deprovision blocks of multiple connections at a time in a "core" cross-connect circuit block between edge cross- connects. The core system is configured to controllably interconnect the physically separate edge cross-connect systems which concurrently direct data along selected paths to and from the central core circuit block.

16 Claims, 14 Drawing Sheets

Related U.S. Application Data continuation of application No. PCT/US2017/055789, filed on Oct. 9, 2017.

(60) Provisional application No. 62/406,060, filed on Oct. 10, 2016.

(56) References Cited

U.S. PATENT DOCUMENTS

| | | |
|---|---|---|
| 6,344,912 B1 | 2/2002 | Hajjar et al. |
| 6,584,267 B1 | 6/2003 | Caveney et al. |
| 6,603,907 B2 | 8/2003 | Stark |
| 6,973,251 B2 | 12/2005 | Morellec et al. |
| 7,289,197 B2 | 10/2007 | Kewitsch |
| 7,315,681 B2 | 1/2008 | Kewitsch |
| 7,460,753 B2 | 12/2008 | Kewitsch |
| 7,665,901 B2 | 2/2010 | Kewitsch |
| 7,702,193 B2 | 4/2010 | Arol et al. |
| 7,747,124 B2 | 6/2010 | Xia et al. |
| 7,920,764 B2 | 4/2011 | Kewitsch |
| 7,924,052 B1 | 4/2011 | Feng et al. |
| 8,068,715 B2 | 11/2011 | Kewitsch |
| 8,150,227 B2 | 4/2012 | Kewitsch |
| 8,175,425 B2 | 5/2012 | Chen |
| 8,203,450 B2 | 6/2012 | German et al. |
| 8,369,321 B2 | 2/2013 | Aybay |
| 8,428,405 B2 | 4/2013 | Kewitsch |
| 8,463,091 B2 | 6/2013 | Kewitsch |
| 8,480,310 B2 | 7/2013 | Kewitsch |
| 8,488,938 B2 | 7/2013 | Kewitsch et al. |
| 8,554,033 B2 * | 10/2013 | Kewitsch .............. G02B 6/3895 398/115 |
| 8,805,155 B2 | 8/2014 | Kewitsch |
| 9,052,465 B2 | 6/2015 | Kewitsch |
| 9,052,490 B2 | 6/2015 | Kewitsch |
| 9,110,249 B2 | 8/2015 | Kewitsch |
| 9,188,748 B2 | 11/2015 | Kewitsch |
| 9,225,666 B1 | 12/2015 | Aybay |
| 9,411,108 B2 | 8/2016 | Kewitsch |
| 9,703,060 B2 | 7/2017 | Kewitsch |
| 9,998,252 B2 | 6/2018 | Lee |
| 10,042,122 B2 | 8/2018 | Kewitsch |
| 10,345,526 B2 | 7/2019 | Kewitsch et al. |
| 10,649,149 B2 | 5/2020 | Kewitsch |
| 10,895,691 B2 | 1/2021 | Kewitsch |
| 10,932,019 B1 | 2/2021 | Marti |
| 10,977,458 B2 | 4/2021 | Kewitsch |
| 2005/0031250 A1 | 2/2005 | Schroeder |
| 2005/0275504 A1 | 12/2005 | Torza |
| 2007/0036480 A1 | 2/2007 | Wu |
| 2010/0046885 A1 * | 2/2010 | Chen ................... G02B 6/3508 385/22 |
| 2010/0220953 A1 * | 9/2010 | Kewitsch ............. G02B 6/3564 385/17 |
| 2010/0278500 A1 | 11/2010 | Campos et al. |
| 2013/0064506 A1 | 3/2013 | Eberle, Jr. et al. |
| 2013/0077919 A1 | 3/2013 | Zong et al. |
| 2013/0294723 A1 | 7/2013 | Kewitsch |
| 2013/0259422 A1 * | 10/2013 | Takeuchi .............. G02B 6/3826 385/20 |
| 2014/0115137 A1 | 4/2014 | Keisam |
| 2014/0314099 A1 | 10/2014 | Dress |
| 2015/0331199 A1 | 11/2015 | Kewitsch |
| 2016/0139348 A1 * | 5/2016 | Basile .................. G02B 6/4403 385/78 |
| 2016/0202424 A1 | 7/2016 | Kewitsch et al. |
| 2017/0171111 A1 | 6/2017 | Khare |
| 2017/0262567 A1 | 9/2017 | Vassilliev |
| 2019/0056553 A1 | 2/2019 | Kewitsch |
| 2019/0293875 A1 | 9/2019 | Kewitsch |
| 2020/0003978 A1 | 1/2020 | Kewitsch |
| 2020/0041725 A1 | 2/2020 | Kewitsch |
| 2020/0358277 A1 | 11/2020 | Kewitsch |
| 2020/0359117 A1 | 11/2020 | Kewitsch |
| 2021/0072483 A1 | 3/2021 | Kewitsch et al. |
| 2021/0149468 A1 | 5/2021 | Walsh |

FOREIGN PATENT DOCUMENTS

| | | |
|---|---|---|
| WO | 2021021280 A1 | 2/2021 |
| WO | 2021046227 A1 | 3/2021 |
| WO | 2021158492 A1 | 8/2021 |

OTHER PUBLICATIONS

USPTO, Non-Final Rejection, dated Jul. 9, 2020 in U.S. Appl. No. 16/543,233, 9 pages.
WIPO, Written Opinion of the International Searching Authority, dated Feb. 5, 2018, for PCT/US2017/055789 (11p.).
WIPO, International Search Report, dated Feb. 5, 2018, for PCT/US2017/055789 (4p.).
WIPO, International Preliminary Report on Patentability, dated May 7, 2019, for PCT/US2017/055789 (1p.).
WIPO, International Search Report, dated Apr. 2, 2021, for PCT/US2020/035776 (3p.).
WIPO, Written Opinion of the International Searching Authority, dated Apr. 2, 2021, for PCT/US2020/035776 (12p.).
USPTO, Non-final Office action for U.S. Appl. No. 16/378,266, dated Aug. 17, 2020. 13 pages.
USPTO, Final Office action for U.S. Appl. No. 16/378,266, dated Feb. 12, 2021. 14 pages.

* cited by examiner

SYSTEM OF LARGE SCALE ROBOTIC FIBER CROSS-CONNECTS USING MULTI-FIBER TRUNK RESERVATION

RELATED APPLICATIONS

This application is a divisional of U.S. application Ser. No. 16/378,266, filed Apr. 8, 2019, which is a continuation of international application no. PCT/US2017/055789, filed Oct. 9, 2017, which claims priority from U.S. Provisional patent application no. 62/406,060, filed Oct. 10, 2016, the entire contents of all of which are hereby fully incorporated herein by reference for all purposes.

COPYRIGHT NOTICE

This patent document contains material subject to copyright protection. The copyright owner has no objection to the reproduction of this patent document or any related materials in the files of the United States Patent and Trademark Office, but otherwise reserves all copyrights whatsoever.

TECHNICAL FIELD

This invention relates to optical systems comprised of fiber optic cables transmitting illumination and/or signals, and more particularly, to large scale, multistage, distributed systems enabling automated reconfiguration and management of fiber optic cables at a large scale (tens of thousands of cables).

BACKGROUND ART

Automated fiber optic cross-connect switches and software-defined patch-panels can automate the management of physical links within data centers and data networks. Current fiber optic switch technologies based on cross-bar architectures scale as $N^2$ (N is the number of ports) making them impractical for large scale production networks. Prior art disclosures of cross-bar switches include U.S. Pat. No. 4,955,686 to Buhrer et al, U.S. Pat. No. 5,050,955 to Sjolinder, U.S. Pat. No. 6,859,575 to Arol et al, and U.S. Patent No. 2011/0116739 A1 to Safrani et al.

A unique switch technology that scales linearly as N utilizes algorithms to produce and maintain a collection of braided, non-repeating fiber optic strands under arbitrary reconfiguration. Advances in the mathematics of topology including Knot and Braid Theory (as disclosed in U.S. Pat. Nos. 8,068,715, 8,463,091, 8,488,938 and 8,805,155 and others to Kewitsch) have solved the fiber entanglement challenge for dense collections of interconnect strands experiencing arbitrary and unlimited reconfigurations. Since this Knots, Braids and Strands (KBS) technology scales linearly with the number of interconnect strands, significant benefits over cross-bar switches in objectives such as port density, modularity, scalability and hardware simplicity are realized.

Existing systems featuring autonomous patch-panel systems and implementing KBS algorithms in accordance with the Kewitsch patents referenced above typically utilize pick and place robotic gantry systems with a gripper at the end of the robotic arm to grab and transport a fiber optic connector and the fiber optic strand extending therefrom to a central backbone in the system. The robotic arm is of a narrow width and extended length to allow it to descend into the dense three-dimensional fiber optic interconnect volume with no mechanical interference and no contact with surrounding fibers, yet still having sufficient rigidity to experience minimal deflection under transverse forces including magnetic repulsion and tension originating from the fiber being carried in the gripper therein. However, further improvements in this new class of physical connection management system are always desirable, including those relating to improvements in compactness, hardware simplicity and operative reliability, singly or in combination.

Specifically, the proven benefits of the Kewitsch patents referenced above have led to consideration of the possible extension of KBS-based technology to more demanding applications. For example, as fiber optic systems have grown in scale and extended to new applications, it has become evident that further new approaches that meet more advanced capacity demands while still embodying the aforesaid benefits can be very desirable. Conceiving and realizing such new approaches while overcoming the complex problems presented by the operative goals are principal objectives of this invention.

SUMMARY

The present invention is specified in the claims as well as in the description.

In some exemplary aspects, the present invention provides fiber optic physical interconnect system architectures to increase the number of cross-connect ports to over 10,000 in an incremental, field expandable approach. In some aspects, this application discloses redundant, large scale, incrementally modular automated cross-connect systems with multiple unique hardware and operative features to provide superior port density, performance and reliability. Two separate arrays of "edge" cross-connect systems using KBS methodology are positioned on opposite sides of a central core cross-connect system comprised of switchable blocks of multi-fiber trunk lines. The trunk lines between edge cross-connects are controlled by the management system to couple contiguous blocks of multiple (e.g. 12) connections at a time in a "core" cross-connect circuit block between edge cross-connects. The core system is configured to controllably interconnect the physically separate edge cross-connect systems which are concurrently directing data along selected paths to and from the central core circuit block. This system expands non-blocking scalability by a factor of about ten or more in port count.

In a somewhat more detailed example of one exemplary system according to exemplary embodiments hereof, like multiples of terminal "edge" modules each having a selected like maximum number of distributed optical fibers, are arrayed on opposite sides of a multi-port "core" cross-connect unit in which the fiber lines comprise switchable blocks. Employing the KBS technology separately in the two different edge module arrays, positioning mechanisms (e.g., robots) operated under separate commands can separately or simultaneously reposition selected fibers in the edge modules to chosen positions. Concurrently, the multi-fiber block cross-connect also employing KBS technology, arranges circuit connections needed in the intermediate central core but does so in multiple fiber groupings (here 12, for example). This establishes programmable continuity in the switchable blocks of multi-fiber trunk lines from and to the edge arrays. The elements of this system can also be increased or reduced in number, permanently or temporarily.

Those skilled in the art will recognize that the complex tasks of determining and generating commands as needed to intermediate fibers through an existing matrix in a selected target location have been resolved by the teachings of the Kewitsch patents referenced above and the commercial systems they embrace, and need not be described here in detail. However, realizing a practical optical network system that is scalable to a switching capacity which is more than an order of magnitude greater than previously realized requires overcoming technical barriers not previously encountered.

Some novel features included in exemplary embodiments hereof arise from the subdivision of functional units into multiple blocks of "edge" units on opposite sides of a "core" cross connecting block and the fact that these edge units and core blocks themselves can be varied in number, together or separately. These more complex combinations are under control of a trunk line reservation system which governs KBS operations internally. Partial or full blocks of edge and core units under central control can be originally incorporated or later added to meet capacity demands. The systems disclosed include variable numbers of lines numbering, e.g., from 1,056 to 12,672 and beyond (sending and receiving) and include different capacities of core cross-connects. This specification thus discloses different variations in the number of edge units and the number of core units cooperating therewith. Also disclosed is an example in which a limited number of edge cross-connects communicate directly with each other without an intervening core cross-connect. This exemplary implementation employs interconnected blocks which redirect fiber optic links in two stages.

Core cross-connect subsystems are also unique to exemplary embodiments hereof, in part because they are configured to receive and individually compensate for (i.e. buffer) length variations within the switchable fixed number of blocks of multi-fiber trunk lines. An exemplary aspect of the invention resides in switching limited sets (e.g. 12) of fiber within the core cross-connect unit, thus offering extra line capacity in the core. The core cross-connect unit (or units) also are configured to accommodate length and configuration changes in accordance with the KBS algorithm by incorporating sets of variable length buffers in a compact arrangement which compensates for minor inter- trunk length variation. This comprises arrays of spring-loaded buffer reels in a compact arrangement.

Special demands are placed on the mechanical and electro-mechanical sub-systems which must engage, transport, and re-insert connectors for the fiber optic lines as they are changed in position. These demands are met by specially conceived and configured gripper, drive and connector embodiments described and claimed hereafter. Since arrays of interrelated KBS edge units are disposed advantageously on opposite sides of the core configuration, centrally controlled fiber transfer mechanisms can move along different edge units under central control.

Other features of exemplary embodiments hereof which facilitate an extremely compact but expandable system reside in the configuration and operation of the expandable cross- connect unit. Here the optical fibers are compacted together in like sets (twelve each in this example) and the sets traverse changeable paths using KBS technology. Their compact variable length sections facilitate maintaining fiber linearity as the fiber ends are moved under command signals to different coupling points. To this end, thus particularly compact and space-adjacent cassettes comprising spring loaded buffer reels are disposed as variable length compensators to maintain fiber curvatures above a minimum.

In accordance with the specifically disclosed examples, twelve Input Edge Network Topology Managers (NTMs) can be arrayed on one side of a Trunk Line Manager (TLN), with twelve Output Edge Network Topology Managers arrayed on the other, all under control of a Trunk Line Reservation System With the NTMs each handling arrays of 1,056×1,056 fibers, and the TLM handling 1,056×1,056 trunk lines (each trunk line comprised of 12 independent fiber channels), a total of 12,672 fiber links can be automatically reconfigured. Further expansion of the Input and Output Edge NTMs and the TLM is readily feasible because the principles of operation are based on an intrinsically modular concept of operation.

One general aspect includes a network system for controllably switching optical signal carrying physical links among a high but variable plurality of optical fibers including: a first plurality of original physical link sorting modules, potentially variable in number and each including optical fibers that carry different ones of a plurality of separate input optical signals to different optical fiber outputs, each sorting module being configured to respond individually to first command signals to interweave different physical links therein to selected ones of the optical fiber outputs; a plurality of signal transferring core trunk lines receiving the optical signals from the first plurality of modules at different ones of a plurality of multi-fiber trunk line groupings, extending to different ones of a plurality of spaced-apart outputs via variable trunk line interconnections controlled in response to a second set of command signals; a second plurality of physical link sorting modules configured to receive the optical signals transported from the multi-fiber trunk lines, and also configured to respond to third command signals to deliver optical signals received from the trunk lines to selected output terminals from each of the second plurality of physical link sorting modules, and a control system coupled to transmit command signals to control the physical link sorting modules and configure the signal transferring core trunk lines in accordance with the requirements then existing for optical signal transmission along different selected physical links.

Implementations may include one or more of the following features:
  A system where the first and second pluralities of physical link sorting modules are like in number and each have like pluralities of separate inputs and outputs, and where each module is configured to interweave the physical links therein between other fibers in the module without entanglement by transporting the physical links through the network system in accordance with an algorithm computing physical links as mathematical strands whose spatial relationships are ordered by the mathematics of knots, braids and strands to ensure entanglement of strands is prevented.
  A system where the plurality of core trunk lines defines a trunk line manager including a multiplicity of multi-fiber trunk line sets, each set including of a fixed like number of optical fibers which is a fraction of the total number of core trunk lines in the network topology manager.
  A system where the first and second pluralities of physical link sorting modules include network topology managers having like numbers of optical fibers in variably determinable paths between inputs and outputs and where the trunk line manager sets variably interconnect the output terminals of the first network topology manager with the input terminals of the second network topology manager in accordance with commands from the control system.
  A system where the network topology manager modules each have about 1,000 or more input fiber ports and 1,000 or more output fiber ports, and the trunk line manager has the same number of multi-fiber inputs and outputs, each input and output able to be interconnected by multi-fiber trunk lines.

A system where the first and second pluralities of physical link sorting modules each include like numbers of network topology manager blocks, each block having a like number of inputs switchable under command signals to selected individual outputs for the given individual block, and where the core trunk lines are arranged in like fractional groupings of a limited number of fiber sets equaling in total the like numbers of fibers in the network topology manager blocks.

A system where the first and second plurality of physical link sorting modules and the core trunk lines are bi-directional in character.

Another general aspect includes a switching system for controlling the transfer of optical signals from a plurality of optical input lines to selected optical output lines as determined by control signals, including: a selected first plurality of optical input lines arranged in a two-dimensional input array plane having orthogonal input axes and extending out of the input plane to a parallel output plane where the lines are distributed about a central axis, the lines between the input array and the output plane being configured in a three-dimensional first switching means to be positioned by first activators in response to first control signals in accordance with the knots, braids and strands principle and responsively moved to selectable first switching positions in a second plane; a second signal controlled multi-line and intermediate switching means coupled to the first switching positions and including multi-lines extending therefrom to a third plane spaced-apart from and parallel to the second plane, the intermediate system including a second plurality of intermediate multi-line switching means controlling the lines extending from the initial coordinates in the second plane to signal designated output switching positions in the third plane in response to second control signals; a third plurality of optical lines operatively coupled to the multi-lines in the intermediate switching system and receiving signals therefrom, and having a different group of lines configured in a three-dimensional third switching means to shift selected lines in the third position to chosen output locations for the lines of the third plurality, and a central system generating control signals for the first, second and third switching means to control the selective transfer of optical signals through the system.

Another general aspect includes an expandable capacity physical optical link routing network for concurrently transferring at least three orders of magnitude of physical optical links at optical frequencies, including: a command and control system providing multiple inputs and command signals for the transfer of concurrent inputs through different stages of operation until selected inputs are delivered to chosen outputs; a first plurality of network topology manager modules, each of the first plurality having substantially like multiple input and output lines and each including a like multi-path configuration for controllably switching signal paths under the knots, braids and strands (KBS) algorithm in accordance with commands from the control system, to provide physical link outputs from selected lines in first plane of the first plurality of modules; a trunk line manager system having a planar plurality of inputs, each receiving a like chosen plurality of different individual output lines from the first plurality of modules and controllably weaving them together in parallel in response to the control system, under the KBS algorithm to provide outputs of different changeable coordinates on a second plane parallel to the first, and a second plurality of network topology modules, each corresponding in number of lines to the number of lines for the modules in the first plurality and each including a second multi-path configuration receiving the outputs from the trunk line manager system for controllably switching signal paths of the lines under the KBS algorithm in accordance with commands from the control system.

Implementations may include one or more of the following features:

A system where the number of modules in the first and second pluralities of modules include twelve each and the trunk line manager system is unitary and positioned between arrays of the first and second pluralities of modules.

A system where the system inputs are applied to the second plurality of network topology manager modules and directed through the trunk line manager to the first plurality of topology manager modules to provide outputs therefrom.

Another general aspect includes an optical fiber physical link routing system with high but still further expandable physical link handling capacity, including: a central processor system providing physical link transfer demands; three interactive optical fiber switching networks under control of the central processor system to direct input communications to chosen ones of a plurality of final destinations for the three switching networks including: a first array of like optical physical link redistribution sub-systems, each configured to sort physical links preliminarily in response to the central processor system in accordance with internal priority to selected individual outputs from the first array; an intermediate physical link redistribution system directing the partially sorted physical links from the first array into separate lines of multiline groupings expanding to redistribution terminals in accordance with assigned multi-line grouping priority from the central processor system, and a second array of like physical link redistribution sub-systems, each configured to sort physical links received from the intermediate redistribution terminals responsive to the central processor system in accordance with internal priority to predetermined system outputs.

Implementations may include one or more of the following features:

A system where the first and second arrays sort physical links using KBS technology in accordance with internal physical link priority, and where the intermediate physical link redistribution system directs multi-line groupings in accordance with multi-line priority.

A system where the intermediate physical link redistribution system includes a selected number of lines grouped together in parallel sets, each set providing for independently variable lengthwise extension.

Another general aspect includes an optical fiber data switching system for controllably transferring multiple physical links between selectable inputs and selectable outputs concurrently in response to command signals and using KBS technology including: a first bank of KBS systems each having at least a minimum three orders of magnitude input line capacity and responsive to command signals to transfer selected inputs to chosen outputs in a first coupling zone of the first bank; an interior KBS system array receiving the first chosen outputs from the first bank coupling zone and configured with multiple optical lines movable together in parallel sets in a KBS configuration in response to command signals, to transfer inputs received from the first bank within the parallel sets to a second coupling zone of interior integrated outputs; and a second bank of KBS systems disposed on the opposite side of the interior KBS system and receiving the interior multiple outputs from the interior KBS system in the second coupling zone and providing finally positioned outputs from the system in response to command signals.

Implementations may include one or more of the following features:

A system where the system further includes a command signal generator for concurrently issuing command signals to the first bank, the interior KBS system, and the second KBS bank to control concurrently the movement of multiple physical links through the system.

A system where the first bank and second bank include at least five KBS systems each, each of the systems receiving at least 100 inputs, and where the parallel sets of fibers in the interior KBS system include at least six optical fibers and means disposed therealong for retracting the majority of their lengths onto a single buffer reel.

A system where the interior KBS system array maintains the optical fibers in laterally proximate sets as the sets are moved into the second bank of KBS systems, and where the interior KBS system includes an interior section for storing variable lengths of optical fibers.

A system where the interior section includes multiple planar arrays of distributed spring-loaded reels, positioned as rotatable bases in a distributed format for each proximate set of optical fibers, and each includes an adjacent variable length section proximate the reel, the reels operate to compensate for length variations of each set of optical fibers caused by repositioning of the set to a different position.

A system where the first and second banks of KBS systems include a large bank of twelve KBS units, each individually including 1,056 fibers, the interior KBS unit maintains the fibers in twelve fiber sets, the second bank includes twelve KBS units, each individually including 1,056 fibers, and the interior KBS units operates with approximately 12,672 fibers total.

Another general aspect includes a method for directing selected ones of a large plurality of optical signals from input optical paths to chosen output paths, including: dividing input optical signals into a plurality of separate groups; redirecting optical signals to the separate groups only partially toward their desired output paths; changing the paths of the partially redirected signals to combine them into signals sets along a chosen plurality of parallel intermediate but changeable paths, and redirecting the selected signals sets to chosen output paths.

Implementations may include a method where in each step the signals are manipulated, at least in part, by using Knots, Braids and Strands technology and where the step of providing a plurality of paths includes including steps including maintaining the signal sets together while compensating for variation in path lengths. A method , further including the further steps of dividing the input signals from a multiplicity of sources into a number of paths, each including a lesser multiplicity of sources, varying the directions of chosen sources toward a transfer zone before a target location, introducing additional paths in the transfer zone, and redirecting the input signals after the transfer zone to selected outputs.

Another general aspect includes an optical fiber switching system for coupling terminal ends at different optical cables into selected ones of an array of spaced apart couplers in a planar distribution of spaced apart columns and rows having an entry side, including: a plurality of optical cables extending into the array from the entry side, each cable including a grouped number of optical fibers with terminal end fitting into a coupler of the array, the terminal end being substantially rigid and of selected length; a fiber positioning system responsive to control signals and dimensioned to fit in the columnar spaces between cables on the entry side and including a signal responsive multi-dimensional drive for engaging a chosen optical cable at its terminal end in the array, the positioning system further including signal responsive means for laterally moving an engaged cable selectively toward or away from a chosen coupler, where the fiber positioning system further includes spaced apart slide bars and a stepper motor positioner coupled to the means for laterally moving the engaged cable parallel to the slide bars, and a system control for selecting optical cables and target positions and providing control signals for the fiber positioning system.

Implementations may include a system where the fiber positioning system includes a narrow rectangular body and the slide bars extend substantially parallel to the direction of movement thereby of a cable therein, and where the positioning system further includes a device for selectively latching and retaining terminal end of cable.

Another general aspect includes an optical fiber signal distribution sub-combination for systems which transfer signals via groups of fibers, the group as a unit moveable with respect to other groups, including: an elongated narrow bar spanning a number of signal junction locations spaced apart along the bar, with each junction location including a female receptacle facing on a first side and a coupling to an external circuit on the opposite side; a changeable number of elongated signal terminals removably engaged in individual ones of the signal junctions in the female receptacles therein, each signal terminal having a length of less than 10 cm and a transverse width of less than 20 mm, and encompassing a number of optical fibers within a flexible sleeve, the fibers extending away from the narrow bar to signal input sources, and a plurality of narrow support elements individually coupled to the narrow bar in individual alignment and adjacency to the signal terminals and extending along at least the majority of the length of the signal terminals.

Implementations may include one or more of the following features a system where the slide bars are mounted longitudinally on a narrow frame and the stepper motor moves the engaged optical cable toward or away from the selected coupler in the array.

Another general aspect includes an optical fiber terminal switching system for changing the location of a selected optical fiber in a two-dimensional distributed planar array of connector receptacles spaced apart in a two-dimensional grid of columns and rows to receive optical fibers from an entry side, including: a plurality of optical fiber lines, each encompassing a selected number of optical fibers in individual housings and each terminating in a length of rigid housing of limited diameter and length for engagement in a selected connector receptacle; a fiber positioning system controllable in position and dimensional to fit between the columns in the receptacle array, the fiber positioning system including a fiber terminal housing engagement mechanism responsive to control signals for selectively controlling the position of the optical fiber terminal housing in a chosen connector receptacle, where the fiber positioning system extends downwardly from the engagement mechanism and includes: a laterally slidable frame mounted on the positioning system and slidable parallel to the optical fiber lines and including vertically separated horizontal shafts mounted for insertion/retraction operation of the frame by the positioning system, where the slidable frame includes a solenoid operated mechanism selectively engaging the terminal length of an optical fiber line to be received in a selected connector, and a stepper motor for incrementing the frame on the shafts laterally to engage or disengage a selected optical fiber housing in a connector receptacle at that location.

Implementations may include a system where the laterally slidable frame is movable by the stepper motor over an insertion/removal distance to engage/disengage from a connector receptacle, and where the inclusive housings of the plurality of optical fiber lines include an elongated, rigid, tubular structure terminating in a lateral face exposing the end faces of the fibers therein.

Another general aspect includes an optical signal transfer device including: a plurality of optical fibers, each encased within individual protective coatings and the plurality further being enclosed in a unifying insulating housing defining an outer diameter of less than about 2 mm; and a substantially rigid coupling body encompassing the insulating housing and a length of no more than about 10 cm and further including a terminal male coupler for inserting a plurality of optical fibers into a corresponding mating female coupler.

Implementations may include one or more of the following features: a device where the fiber plurality is twelve, where the insulating housing is a flexible material with low coefficient of friction, and where the device further includes, in the coupling body adjacent the male coupler end, an external magnet arrangement to retain housing within male coupler.

Below is a list of system aspects. Those will be indicated with a letter "S". Whenever such embodiments are referred to, this will be done by referring to "S" aspects.

S1. A network system for controllably switching optical signal carrying physical links among a high but variable plurality of optical fibers comprising:
   a first plurality of original physical link sorting modules, potentially variable in number and each including optical fibers that carry different ones of a plurality of separate input optical signals to different optical fiber outputs, each sorting module being configured to respond individually to first command signals to interweave different physical links therein to selected ones of the optical fiber outputs;
   a plurality of signal transferring core trunk lines receiving the optical signals from the first plurality of modules at different ones of a plurality of multi-fiber trunk line groupings, extending to different ones of a plurality of spaced-apart outputs via variable trunk line interconnections controlled in response to a second set of command signals;
   a second plurality of physical link sorting modules configured to receive the optical signals transported from the multi-fiber trunk lines, and also configured to respond to third command signals to deliver optical signals received from the trunk lines to selected output terminals from each of the second plurality of physical link sorting modules, and
   a control system coupled to transmit command signals to control the physical link sorting modules and configure the signal transferring core trunk lines in accordance with the requirements then existing for optical signal transmission along different selected physical links.

S2. A system as in S1 above, wherein the first and second pluralities of physical link sorting modules are like in number and each have like pluralities of separate inputs and outputs, and wherein each module is configured to interweave the physical links therein between other fibers in the module without entanglement by transporting the physical links through the network system in accordance with an algorithm computing physical links as mathematical strands whose spatial relationships are ordered by the mathematics of knots, braids and strands to ensure entanglement of strands is prevented.

S3. A system as in S1 or S2 above, wherein the plurality of core trunk lines defines a trunk line manager comprising a multiplicity of multi-fiber trunk line sets, each set consisting of a fixed like number of optical fibers which is a fraction of the total number of core trunk lines in the network topology manager.

S4. A system as in any of S1-S3 above, wherein the first and second pluralities of physical link sorting modules comprise network topology managers having like numbers of optical fibers in variably determinable paths between inputs and outputs and wherein the trunk line manager sets variably interconnect the output terminals of the first network topology manager with the input terminals of the second network topology manager in accordance with commands from the control system.

S5. A system as in any of S1-S4 above, wherein the network topology manager modules each have about 1,000 or more input fiber ports and 1,000 or more output fiber ports, and the trunk line manager has the same number of multi-fiber inputs and outputs, each input and output able to be interconnected by multi-fiber trunk lines.

S6. A system as in any of S1-S5 above, wherein the first and second pluralities of physical link sorting modules each comprise like numbers of network topology manager blocks, each block having a like number of inputs switchable under command signals to selected individual outputs for the given individual block, and wherein the core trunk lines are arranged in like fractional groupings of a limited number of fiber sets equaling in total the like numbers of fibers in the network topology manager blocks.

S7. A system as in any of S1-S6 above, wherein the first and second plurality of physical link sorting modules and the core trunk lines are bi-directional in character.

S8. A switching system for controlling the transfer of optical signals from a plurality of optical input lines to selected optical output lines as determined by control signals, comprising:
   a selected first plurality of optical input lines arranged in a two-dimensional input array plane having orthogonal input axes and extending out of the input plane to a parallel output plane wherein the lines are distributed about a central axis, the lines between the input array and the output plane being configured in a three-dimensional first switching means to be positioned by first activators in response to first control signals in accordance with the knots, braids and strands principle and responsively moved to selectable first switching positions in a second plane;
   a second signal controlled multi-line and intermediate switching means coupled to the first switching positions and including multi-lines extending therefrom to a third plane spaced-apart from and parallel to the second plane, the intermediate system comprising a second plurality of intermediate multi-line switching means controlling the lines extending from the initial coordinates in the second plane to signal designated output switching positions in the third plane in response to second control signals;

a third plurality of optical lines operatively coupled to the multi-lines in the intermediate switching system and receiving signals therefrom, and having a different group of lines configured in a three-dimensional third switching means to shift selected lines in the third position to chosen output locations for the lines of the third plurality, and a central system generating control signals for the first, second and third switching means to control the selective transfer of optical signals through the system S9. An expandable capacity physical optical link routing network for concurrently transferring at least three orders of magnitude of physical optical links at optical frequencies, comprising:

a command and control system providing multiple inputs and command signals for the transfer of concurrent inputs through different stages of operation until selected inputs are delivered to chosen outputs;

a first plurality of network topology manager modules, each of the first plurality having substantially like multiple input and output lines and each comprising a like multi-path configuration for controllably switching signal paths under the knots, braids and strands (KBS) algorithm in accordance with commands from the control system, to provide physical link outputs from selected lines in first plane of the first plurality of modules;

a trunk line manager system having a planar plurality of inputs, each receiving a like chosen plurality of different individual output lines from the first plurality of modules and controllably weaving them together in parallel in response to the control system, under the KBS algorithm to provide outputs of different changeable coordinates on a second plane parallel to the first, and a second plurality of network topology modules, each corresponding in number of lines to the number of lines for the modules in the first plurality and each comprising a second multi-path configuration receiving the outputs from the trunk line manager system for controllably switching signal paths of the lines under the KBS algorithm in accordance with commands from the control system S10. A system as in S9 above, wherein the number of modules in the first and second pluralities of modules comprise twelve each and the trunk line manager system is unitary and positioned between arrays of the first and second pluralities of modules.

S11. A system as in any of S9 or S10 above, wherein the system inputs are applied to the second plurality of network topology manager modules and directed through the trunk line manager to the first plurality of topology manager modules to provide outputs therefrom.

S12. An optical fiber physical link routing system with high but still further expandable physical link handling capacity, comprising:

a central processor system providing physical link transfer demands;

three interactive optical fiber switching networks under control of the central processor system to direct input communications to chosen ones of a plurality of final destinations for said three switching networks comprising:

a first array of like optical physical link redistribution sub-systems, each configured to sort physical links preliminarily in response to the central processor system in accordance with internal priority to selected individual outputs from the first array;

an intermediate physical link redistribution system directing the partially sorted physical links from the first array into separate lines of multi- line groupings expanding to redistribution terminals in accordance with assigned multi-line grouping priority from the central processor system, and a second array of like physical link redistribution sub-systems, each configured to sort physical links received from the intermediate redistribution terminals responsive to the central processor system in accordance with internal priority to predetermined system outputs.

S13. A system as in S12 above, wherein the first and second arrays sort physical links using KBS technology in accordance with internal physical link priority, and wherein the intermediate physical link redistribution system directs multi-line groupings in accordance with multi-line priority.

S14. A system as in any of S12 or S13 above, wherein the intermediate physical link redistribution system comprises a selected number of lines grouped together in parallel sets, each set providing for independently variable lengthwise extension.

S15. An optical fiber data switching system for controllably transferring multiple physical links between selectable inputs and selectable outputs concurrently in response to command signals and using KBS technology comprising:

a first bank of KBS systems each having at least a minimum three orders of magnitude input line capacity and responsive to command signals to transfer selected inputs to chosen outputs in a first coupling zone of the first bank;

an interior KBS system array receiving the first chosen outputs from the first bank coupling zone and configured with multiple optical lines movable together in parallel sets in a KBS configuration in response to command signals, to transfer inputs received from the first bank within the parallel sets to a second coupling zone of interior integrated outputs; and a second bank of KBS systems disposed on the opposite side of the interior KBS system and receiving the interior multiple outputs from the interior KBS system in the second coupling zone and providing finally positioned outputs from the system in response to command signals.

S16. A system as in S15 above, wherein the system further comprises a command signal generator for concurrently issuing command signals to the first bank, the interior KBS system, and the second KBS bank to control concurrently the movement of multiple physical links through the system.

S17. A system as in any of S15 or S16 above, wherein the first bank and second bank comprise at least five KBS systems each, each of said systems receiving at least 100 inputs, and wherein the parallel sets of fibers in the interior KBS system comprise at least six optical fibers and means disposed therealong for retracting the majority of their lengths onto a single buffer reel.

S18. A system as in any of S15-S17 above, wherein the interior KBS system array maintains the optical fibers in laterally proximate sets as the sets are moved into the second bank of KBS systems, and wherein the interior KBS system includes an interior section for storing variable lengths of optical fibers.

S19. A system as in any of S15-S18 above, wherein the interior section comprises multiple planar arrays of distributed spring loaded reels, positioned as rotatable bases in a distributed format for each proximate set of optical fibers, and each includes an adjacent variable length section proximate the reel, said reels operate to compensate for length variations of each set of optical fibers caused by repositioning of the set to a different position.

S20. A system as in any of S15-S19 above, wherein the first and second banks of KBS systems comprise a large bank of twelve KBS units, each individually comprising 1,056 fibers, the interior KBS unit maintains the fibers in twelve fiber sets, the second bank comprises twelve KBS units, each individually comprising 1,056 fibers, and the interior KBS units operates with approximately 12,672 fibers total.

S21. An optical fiber switching system for coupling terminal ends at different optical cables into selected ones of an array of spaced apart couplers in a planar distribution of spaced apart columns and rows having an entry side, comprising:
a plurality of optical cables extending into the array from the entry side, each cable comprising a grouped number of optical fibers with terminal end fitting into a coupler of the array, the terminal end being substantially rigid and of selected length;
a fiber positioning system responsive to control signals and dimensioned to fit in the columnar spaces between cables on the entry side and including a signal responsive multi-dimensional drive for engaging a chosen optical cable at its terminal end in the array, said positioning system further including signal responsive means for laterally moving an engaged cable selectively toward or away from a chosen coupler, wherein the fiber positioning system further comprises spaced apart slide bars and a stepper motor positioner coupled to the means for laterally moving the engaged cable parallel to the slide bars, and
a system control for selecting optical cables and target positions and providing control signals for the fiber positioning system.

S22. A system as in S21 above, wherein the fiber positioning system comprises a narrow rectangular body and the slide bars extend substantially parallel to the direction of movement thereby of a cable therein, and wherein the positioning system further includes a device for selectively latching and retaining terminal end of cable.

S23. An optical fiber signal distribution sub-combination for systems which transfer signals via groups of fibers, the group as a unit moveable with respect to other groups, comprising:
an elongated narrow bar spanning a number of signal junction locations spaced apart along the bar, with each junction location including a female receptacle facing on a first side and a coupling to an external circuit on the opposite side;
a changeable number of elongated signal terminals removably engaged in individual ones of the signal junctions in the female receptacles therein, each signal terminal having a length of less than 10 cm and a transverse width of less than 20 mm, and encompassing a number of optical fibers within a flexible sleeve, the fibers extending away from the narrow bar to signal input sources, and
a plurality of narrow support elements individually coupled to the narrow bar in individual alignment and adjacency to the signal terminals and extending along at least the majority of the length of the signal terminals.

S24. A system as in S23 above, wherein the slide bars are mounted longitudinally on a narrow frame and the stepper motor moves the engaged optical cable toward or away from the selected coupler in the array.

S25. An optical fiber terminal switching system for changing the location of a selected optical fiber in a two-dimensional distributed planar array of connector receptacles spaced apart in a two-dimensional grid of columns and rows to receive optical fibers from an entry side, comprising:
a plurality of optical fiber lines, each encompassing a selected number of optical fibers in individual housings and each terminating in a length of rigid housing of limited diameter and length for engagement in a selected connector receptacle;
a fiber positioning system controllable in position and dimensional to fit between the columns in the receptacle array, said fiber positioning system including a fiber terminal housing engagement mechanism responsive to control signals for selectively controlling the position of the optical fiber terminal housing in a chosen connector receptacle, wherein the fiber positioning system extends downwardly from the engagement mechanism and comprises:
a laterally slidable frame mounted on the positioning system and slidable parallel to the optical fiber lines and including vertically separated horizontal shafts mounted for insertion/retraction operation of the frame by the positioning system, wherein the slidable frame comprises a solenoid operated mechanism selectively engaging the terminal length of an optical fiber line to be received in a selected connector, and a stepper motor for incrementing the frame on the shafts laterally to engage or disengage a selected optical fiber housing in a connector receptacle at that location.

S26. A system as in S25 above, wherein the laterally slidable frame is movable by the stepper motor over an insertion/removal distance to engage/disengage from a connector receptacle, and wherein the inclusive housings of the plurality of optical fiber lines include an elongated, rigid, tubular structure terminating in a lateral face exposing the end faces of the fibers therein.

Below is a list of device aspects. Those will be indicated with a letter "D". Whenever such aspects are referred to, this will be done by referring to "D" embodiments.

D27. An optical signal transfer device comprising:
a plurality of optical fibers, each encased within individual protective coatings and the plurality further being enclosed in a unifying insulating housing defining an outer diameter of less than about 2 mm; and
a substantially rigid coupling body encompassing the insulating housing and a length of no more than about 10 cm and further including a terminal male coupler for inserting a plurality of optical fibers into a corresponding mating female coupler.

D28. A device as in D27 above, wherein the fiber plurality is twelve, wherein the insulating housing is a flexible material with low coefficient of friction, and wherein the device further includes, in the coupling body adjacent the male coupler end, an external magnet arrangement to retain housing within male coupler.

Below is a list of method (or process) aspects. Those will be indicated with a letter "M". Whenever such aspects are referred to, this will be done by referring to "M" aspects.

M29. A method for directing selected ones of a large plurality of optical signals from input optical paths to chosen output paths, the method comprising:
dividing input optical signals into a plurality of separate groups; redirecting optical signals to the separate groups only partially toward their desired output paths;
changing the paths of the partially redirected signals to combine them into signals sets along a chosen plurality of parallel intermediate but changeable paths, and
redirecting the selected signals sets to chosen output paths.

M30. A method as in M29 above, wherein in each step the signals are manipulated, at least in part, by using Knots, Braids and Strands technology and wherein the step of providing a plurality of paths comprises including steps comprising maintaining the signal sets together while compensating for variation in path lengths.

M31. A method as in M29-M30, further including dividing the input signals from a multiplicity of sources into a number of paths, each including a lesser multiplicity of sources, varying the directions of chosen sources toward a transfer zone before a target location, introducing additional paths in the transfer zone, and redirecting the input signals after the transfer zone to selected outputs.

The above features along with additional details of the invention, are described further in the examples herein, which are intended to further illustrate the invention but are not intended to limit its scope in any way.

BRIEF DESCRIPTION OF THE DRAWINGS

A better understanding of the invention may be had by reference to the accompanying drawings, in which the reference numbers refer to like parts, and in which.

GLOSSARY AND ABBREVIATIONS

As used herein, including in the claims, unless used or described otherwise, the following terms or abbreviations have the following meanings:
LC means Lucent connector (or Little Connector or Local Connector);
MT means mechanical transfer;
MPO means multi-fiber push on; and
MTP is used by US Conec to describe their MPO connector. MTP is a registered trademark of US Conec.

DETAILED DESCRIPTION

This application relates to and extends from the previously disclosed patents and other publications on the Knots, Braids and Strands (KBS) methodology for controllably managing elements of a dense array of optical fibers without physical entanglement or unacceptable signal loss. A number of novel features and relationships devised to further advance the state of the KBS are disclosed and discussed in this introductory section of this specification to provide context and enable appreciation of more detailed features presented thereafter.

Figure 1:
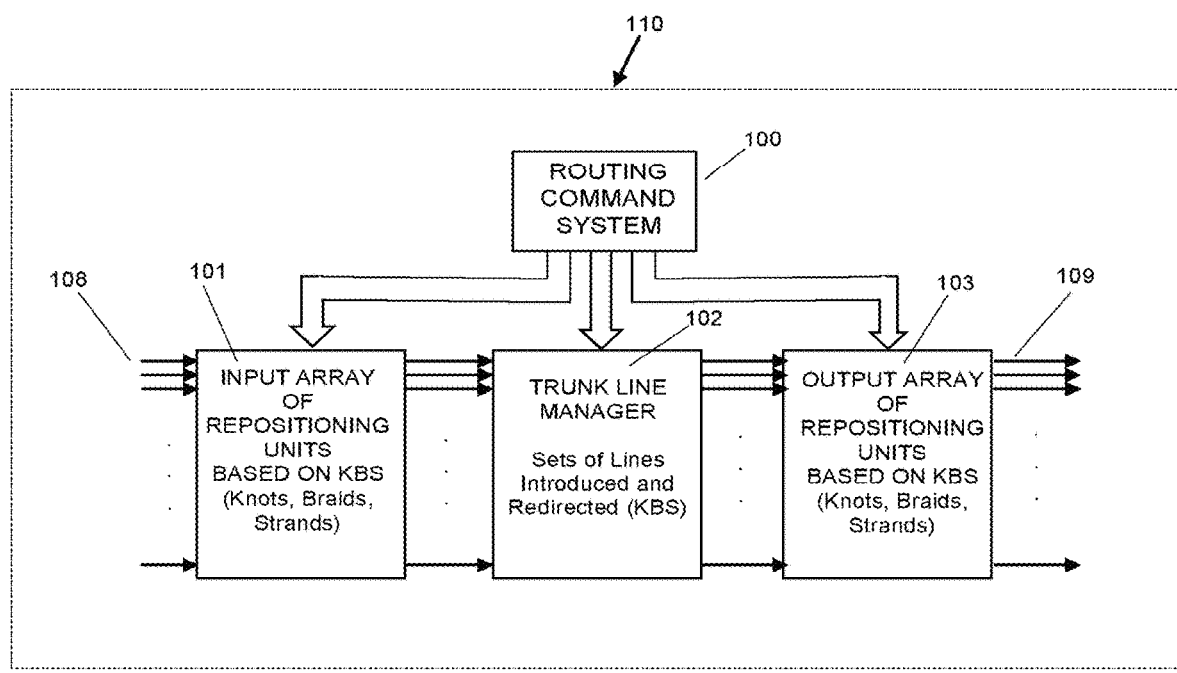
FIG. 1 is a generalized block diagram of a system in accordance with exemplary embodiments hereof, comprising a TLM core unit and oppositely coupled input and output array edge units with generalized system controls.

Refer now to FIG. 1, which includes other background features but principally depicts three generalized system blocks 101, 102, 103, greatly and differentially consolidated, representing important features and arranged as a large scale, multi-stage cross-connect system 110 in accordance with exemplary embodiments hereof. Each system block 101, 103 is functionally a physical link sorting module, enabling links to be arranged in any arbitrary ordered state by the controller 100 and subsequently reordered without limitation as needed. The system 110 is depicted for simplicity as unidirectional, with inputs 108 on the left and outputs 109 on the right, but it will be evident that a bidirectional capability is also evident but not described at this point. Here the system 110 blocks begin at the left with a first entry system 101-1 ... 101-12 representing multiple KBS units, here presumptively positioned in parallel in a horizontal axis, with multiple spaced apart parallel inputs 108 on the left. The inputs feed the internal and separate but nonetheless system 100 controlled KBS repositionings in the central system 102. Outputs from the entry system 101 are repositioned to other coordinates as directed by the command system 100, but this repositioning, in accordance with exemplary embodiments hereof, is only preliminary and partial. At this point the partially redistributed fibers are not then coupled to the output system 103 of KBS units, except in the configuration, noted below, but to an interposed Trunk Line Manager 102 (TLM) which is positioned before the final bank of KBS units 103-1 ... 103-12 in the output system 103. The TLM 102 effects another line redistribution before the final outputs 109 are first configured and then delivered, from the output system 103.

The inclusion and operation of the TLM 102 in concert with the multi-line entry system 101 and multi-line output system 103 present a number of novel departures in the technology of optical line switching. The Trunk Line Manager 102 does not switch individual fiber optic lines but sets of optical fibers (here twelve (12) each (although the number can be varied), encapsulated in an individual sleeve 34, as seen in the fragmentary view of FIG. 2. These fiber groupings or sets extend from the input side of the trunk line manager to the output side. Variable length buffers 120 in a compact arrangement compensate for length variations between the individual trunk line groupings. The design of such fiber buffers has been described previously in the aforementioned patents to Kewitsch et al.

Referring again to FIG. 1, it is to be understood that programmed independent and simultaneous movement of selected individual fibers extending from their vertical locations takes place through different appropriate active non-blocking KBS units 101 and 103. This step continues until their intermediate target locations on the entry side are reached so that interconnection can be made at the TLM 102. The referenced KBS patents can be accessed for their teachings as to three-dimensional interweaving of fibers as they are transported from one location to another, as to lateral incremental shifting of fiber rows to augment interweaving.

It should be understood that, although the optical fibers are manipulated in the Trunk Line Manager 102 in twelve line sets within their common housings, they are nonetheless interwoven as sets using the Knots, Braids and Strands methodology. Each fiber bundle is interwoven through the three-dimensional distribution of fiber bundles in the Trunk Line Manager using the KBS teaching until an input fiber 108 is connected to an output fiber 109 by an internal cross-connect.

At the output array 103, the individual inputs from the Trunk Line Manager 102 are again routed, in KBS mode, to selected individual outputs 109 under control of the routing command System 100. Consequently, it can be seen that there is not only capability for routing thousands of links selectively, but that a vast lateral switching capability is available on demand through the available capacity in the multiple and integrated lines in the Trunk Line Manager.

Figure 3:
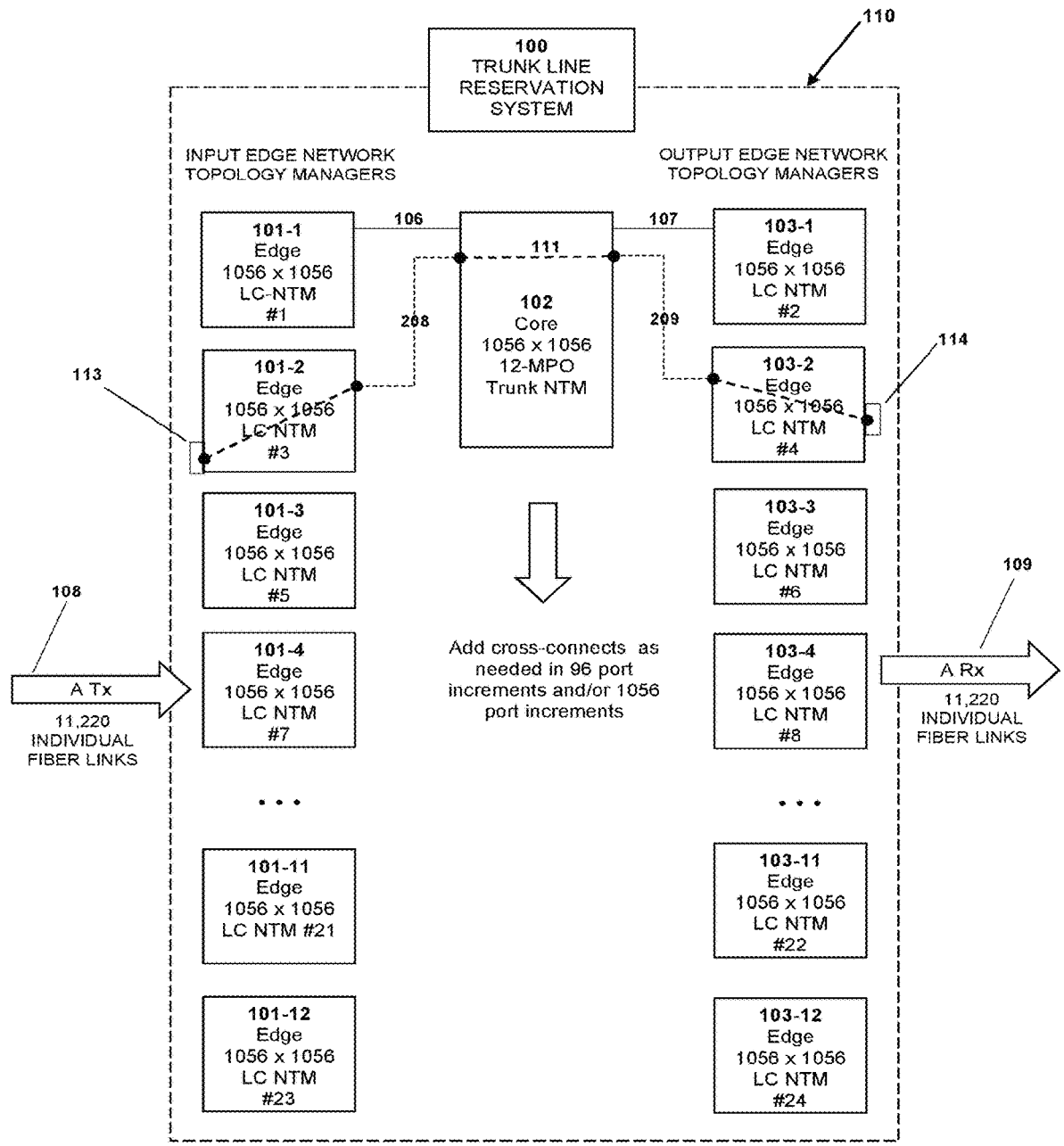
FIG. 3 is a combined but generalized block diagram of a more detailed example of the large-scale cross-connect system in accordance with exemplary embodiments hereof.

However, the present system is further uniquely different, as is evident from FIG. 3, and merits some detailed discussion here, of the intermediate section of the light transit paths between the input and output terminals. These paths changeably traverse their successive and different lengths of optical fiber, which are each separately positioned. Specifically, the input light paths are controllably routed into the entry system 101 on a single fiber KBS route, then go along a chosen multi-fiber KBS route 106 through the Trunk Line Manager 103 and then to the output system 103 by another controllable multi-fiber KBS route 107 to the chosen array. This provides a massive number of controllably variable light communication paths distributed transversely and extending longitudinally between the spaced apart input and output terminal arrays. Note that the longitudinal division of the KBS units is subdivided into initial 101, intermediate 102 and final 103, each unique individually as well as in combination. The tens of thousands of input lines 108 from external sources to the large-scale interconnect system 110 are received by the different KBS units 101-1 ... 101-12 (see FIG. 3, etc.) within the system 110, partially redistributed under system command, and delivered individually to chosen inputs of the Trunk Line Manager unit 102. The TLM 102 is configured to very significantly increase the usable number of conveniently available signal paths between the input terminal array formed in combination by 101-1 ... 101-12 and the output terminal array formed in combination by 103-1 ... 103-12, employing novel configuration of optical fiber groups, each comprised of multiple fibers (typically 12 as shown herein), and said groups (rather than individual optical fibers) each configured in the KBS format.

More specifically, the TLM 102 comprises changeable KBS matrices in which the grouped sets 203 of fibers each traverse changeable paths between inputs adjacent the entry system 101 and outputs adjacent the output system 103.

The internal fiber sets 203 changeably connected to external fiber groups 208, 209 on the TLM 102 engage as a group to an individual coupler 208 on the outer surface of the TLM 102, such that like couplers 209 at the opposite side of the TLM 102 through connections 107 can be attached to the output system 103. The single connection arrangement of internal multi-fiber sets 203 affords hitherto unattainable operative flexibility, there spatial limits established by a common spring-loaded buffer 112 serving each group 203 of twelve lines. The circular buffers have like radii of curvature large enough to prevent optical signal loss from the buffer loop.

As noted previously, within the TLM 102, the sets of internal fibers (internal multi fiber trunk lines 111) have repositionable segments 203 that are translatable under command in the KBS format, with length variations introduced during movement being automatically compensated by the buffers 112 as the common connectorized end 204 of the multiple fibers 203 moves to a new location, where it is coupled to a fiber on the exit system 103, which can be commanded through system 100 to move to a selected output 109.

Thus, the TLM 102 manages multi-fiber trunk lines 111 terminated in switchable connectors 204 and forms programmable interconnection fabric between the network topology managers 101, 103. To this end, trunk lines spanning the network topology managers are reserved by the topology management system 100 to provision contiguous blocks of twelve connections at a time. In a system 110 such as seen in FIG. 1, including a TLM 102 with twelve fibers per port, strict non-blocking scalability is achievable for greater than about 10,000×10,000 optical links. It will be shown that this capacity can be varied to be either smaller or larger, either fractionally or in multiples.

Figure 2:
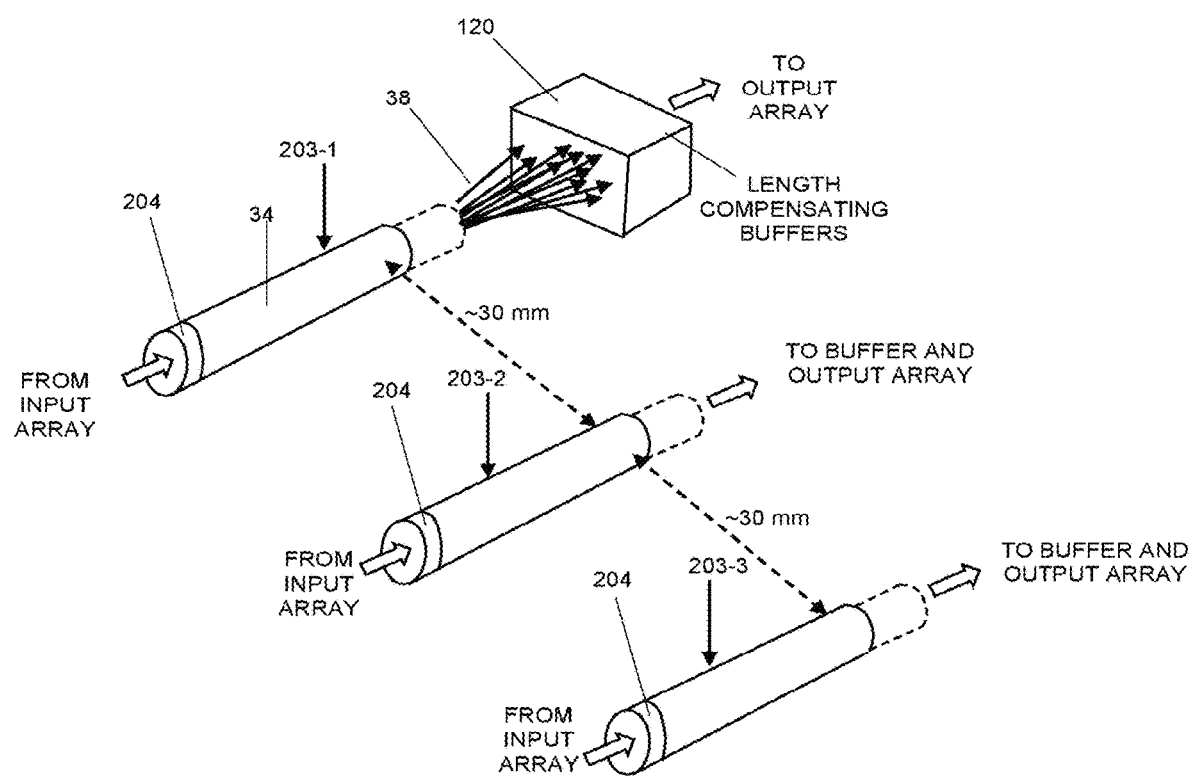
FIG. 2 is an enlarged, fragmentary perspective view of a portion of the TLM's internal multi-fiber trunk lines used in the system of FIGS. 1 and 3.

The system uses a novel configuration of multiply grouped optic fibers comprising a single optical fiber bundle 203 or "strand." Referring now to FIG. 2, it can be seen that the multiple fiber groupings (here twelve in number although other groupings can be used, are diametrically compact with an encompassing cover or housing or sleeve 34 of suitable pliant material with connector end 204. FIG. 2 illustrates in somewhat idealized form (for clarity) a portion of the relative configuration of several internal multi-cables 203-1, 203-2, 203-3 as they are positioned in the TLM 102. Each multi-cable, as previously described, has a dozen separate but closely proximate individual optical fiber strands 35 comprising multi-fiber bundle 203 extending from a connector 204 on its changeable end for coupling to a signal from the input array 101 and is the repositionable segment of the multi-segment but contiguous trunk line 111 within the TLM. The paths of all multi-cables in the TLM 102 are changeable on command, as previously described, and they are selectively transferred. They each terminate, as shown in FIG. 2, in a multi-fiber block length compensating buffer 112 before they are transferred on to the output array 103. This enables the use of substantial path length variations in the TLM. This configuration permits fiber groupings to be drawn to different longitudinal lengths for connection purposes to different coupling points. In a particular example, individual optical fibers with a cladding diameter of 80 microns and a coating outer diameter of 165 microns are preferred because it allows 12 fibers to be closely packed within a flexible, low friction plastic tube having an outer diameter of less than 2 mm, preferably less than 1 mm Suitable materials for the extruded plastic sleeve include PVC, PVDF, PTFE, PFA, ETFE, etc.

Refer again to FIG. 3 for a more complete explanation of the management and operation of a high capacity optical cross-connect 110 example in accordance with exemplary embodiments hereof. This example is also configured to provide any-to-any connectivity between 12,672 transmit and receive lines, and constitutes a substantial advance in the state of the art. Nonetheless, other examples are also given below of systems in accordance with exemplary embodiments hereof having both greater and lesser number of lines, as seen in the Tables that follow. In FIG. 3 the system is shown as 12,672 individual transmitting links (Tx) and 12,672 receiving links (Rx). System control capability of the individual Input Edge NTMs 101, Output Edge NTMs 103 as well as the Core Trunk Line Manager 102 is evidenced by the above referenced patent of the present assignee, so this aspect will not be described in detail. Instead, as seen in FIG. 3, overall control capability is encapsulated within the overall Trunk Line Reservation System 100 as previously described relative to FIG. 1.

Figure 4:
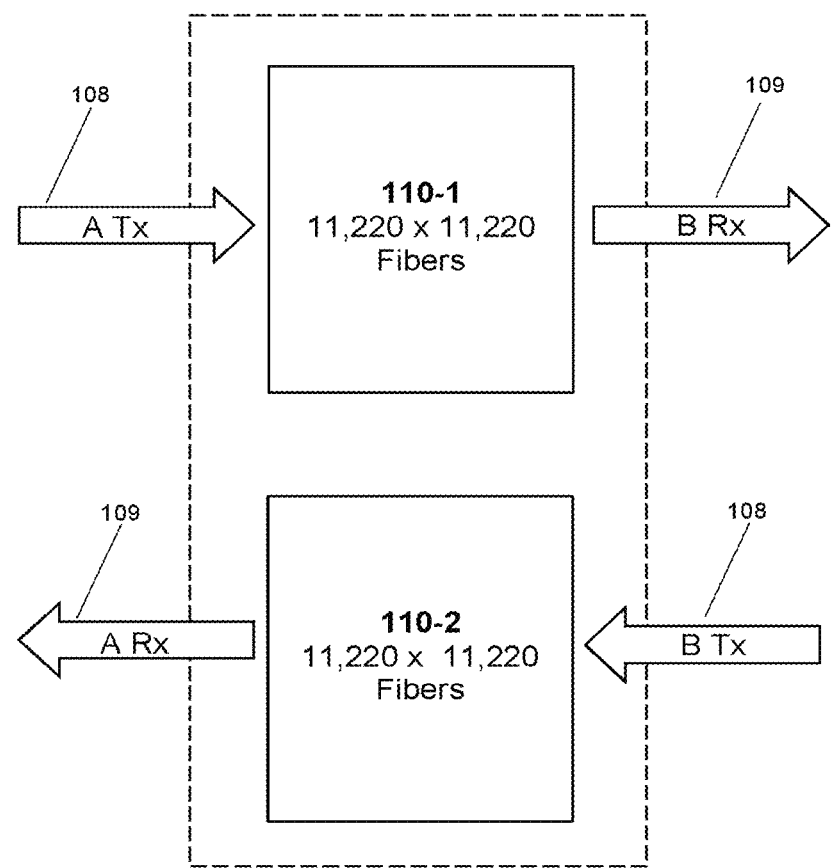
FIG. 4 is a combined but generalized block diagram of the system with a further factor of two increase in port capacity.

FIG. 4 shows a further factor of two increase in cross-connect capacity, for a system comprised or two cross-connects 110-1, 110-2 that extend the capability to, for example, 11,220 transmit and received lines to equipment of type A and 11,220 transmit and receive lines to equipment of type B.

In FIG. 3, as in FIG. 1, the array of Input Edge Network Topology Managers comprises an array of twelve units 101-1, 101-2 . . . 101-12, as does the array of twelve units 103-1, 103-2 . . . 103-12 of Output Edge Network Topology Managers. The input edge array 101 of NTMs partially and internally redirect the individual inputs they receive onto selected ones of the plurality of trunk lines 106 as input to the core TLM 102. In the core TLM, plural line groupings 111 are established and output, now as redirected trunk line pluralities 107. The output edge NTMs 103 again redirect these received signals under unified command to different terminals at the final outputs 109. As illustrated in FIG. 11, it will be recognized that not all the NTM fiber modules 104 shown need be included, or employed, and that the system can be incrementally scaled to cross-connect from 96 to 12,652 links or more as shown in the sequence of FIGS. 10-13. It will also be recognized that external connections and details, such as input and output ports, LC connectors and MPO connectors have not been shown for simplicity in view of their obviousness in the state of the art.

It should be noted that the modularity and configuration of these systems facilitate versatility in system design and adaptation for both varying design and usage. Referring to FIG. 11, each NTM in comprised of say, eleven fiber modules 104 that each consist of 96 individual fibers, terminated at both ends, as with conventional single fiber LC connectors (not shown in detail). The network of NTMs 101, 103, each comprised of fiber modules 104, can be scaled upwardly, up to twenty-four NTMs can be individually and incrementally connected to the core (or central) TLM 102, twelve on the input side and twelve on the output side. NTMs may be distributed across the data center and their trunk lines may be run back to a central TLM.

Figure 12:
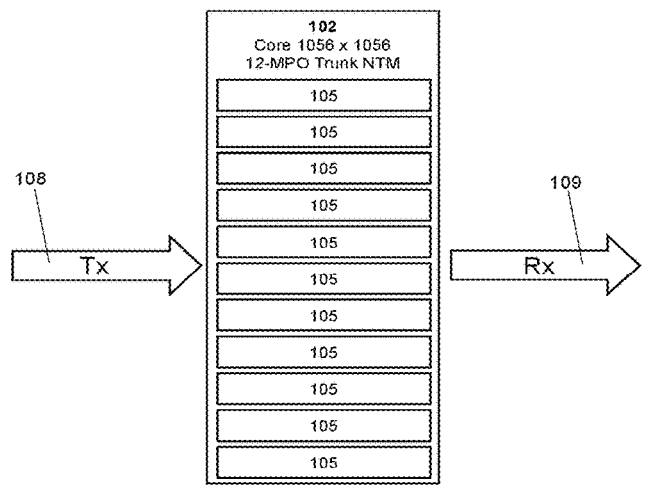
FIG. 12 depicts an aspects of a core NTM according to exemplary embodiments hereof.
Figure 13:
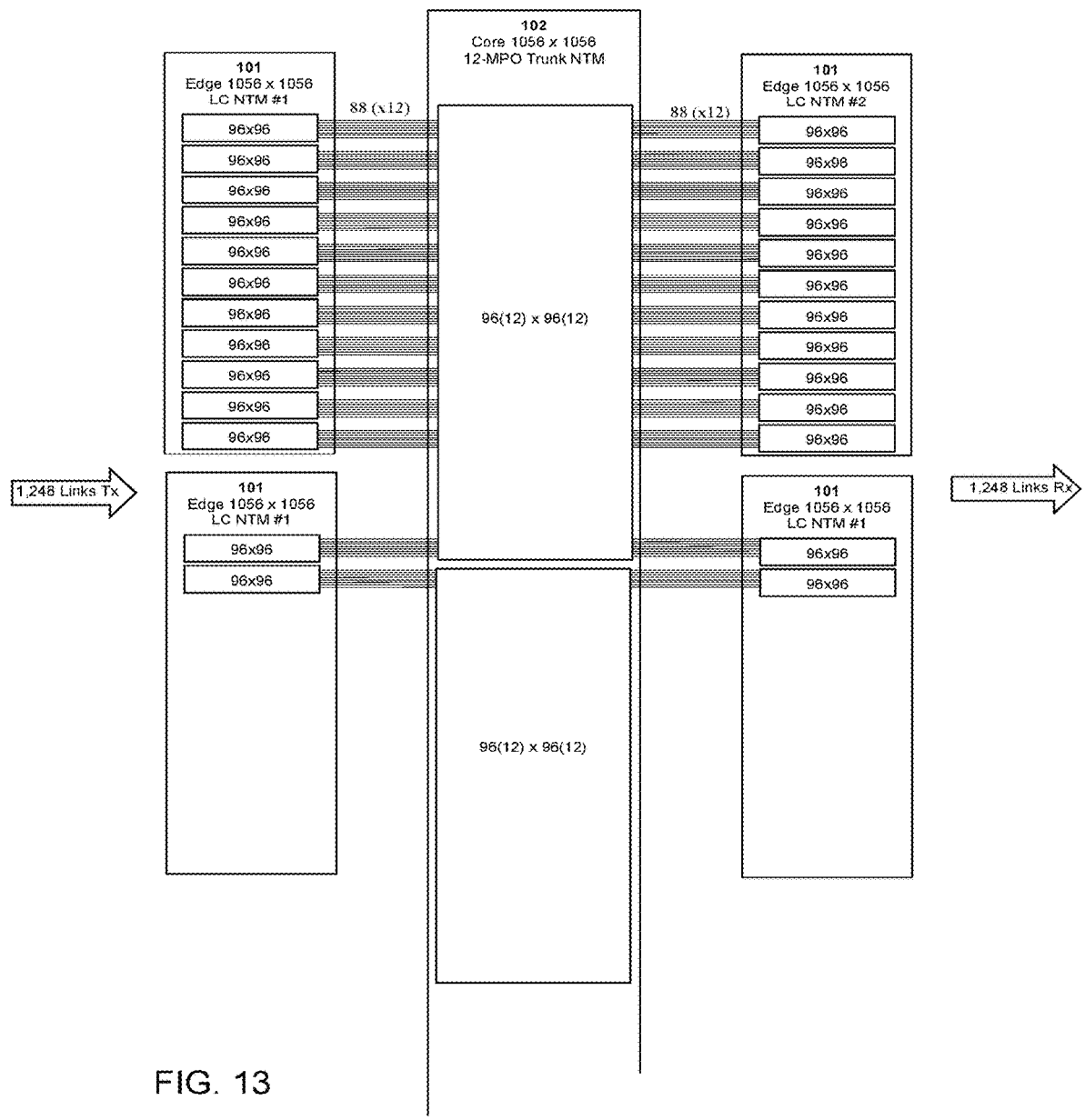
FIG. 13 illustrates an extension of the cross-connect of FIG. 11 beyond 1,056 links, for example to 1,248 links, by incorporation of a core NTM.
Figure 14:
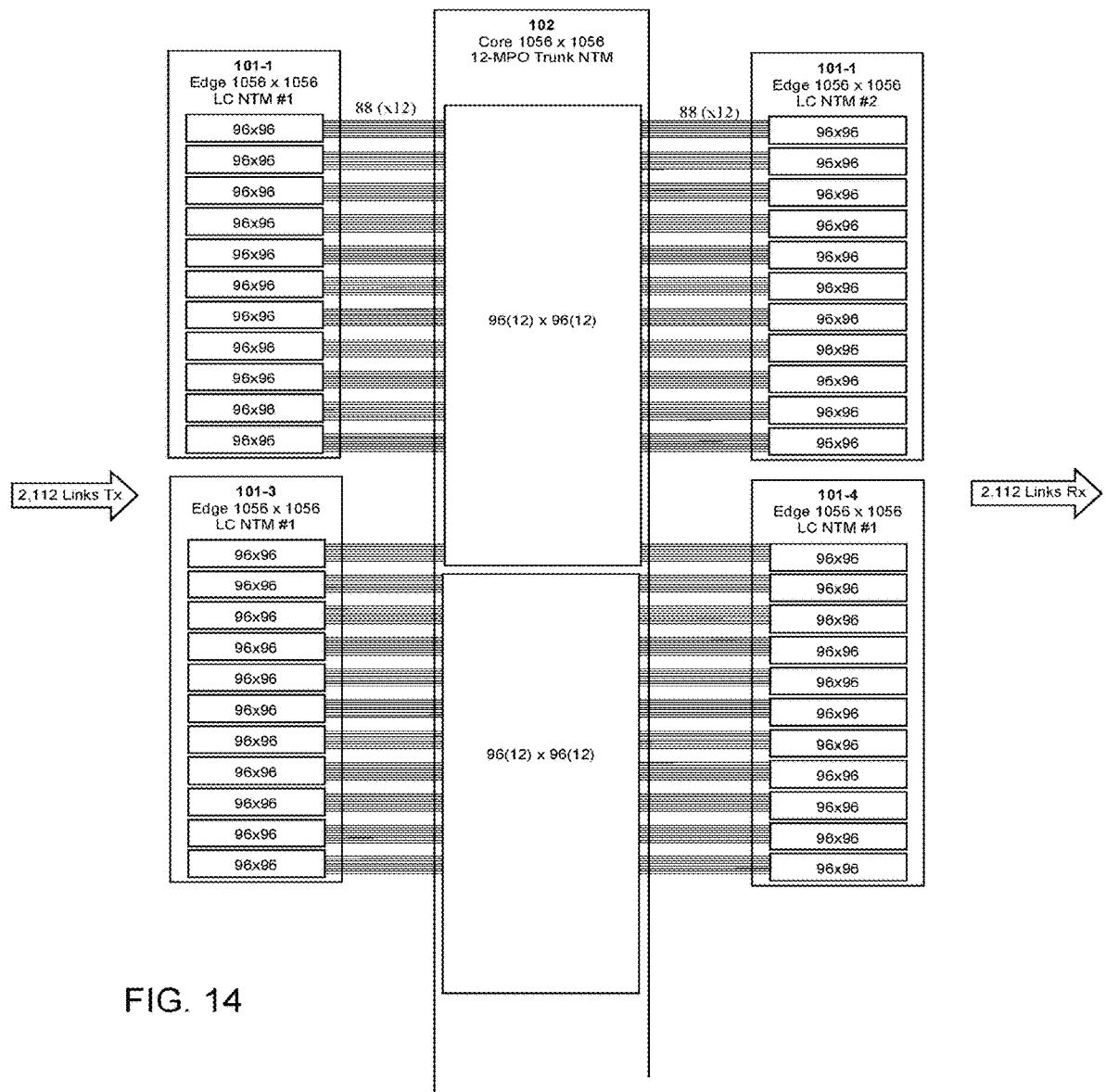
FIG. 14 depicts the extension of the cross-connect of FIGS. 11 to 2,112 links.
Figure 15:
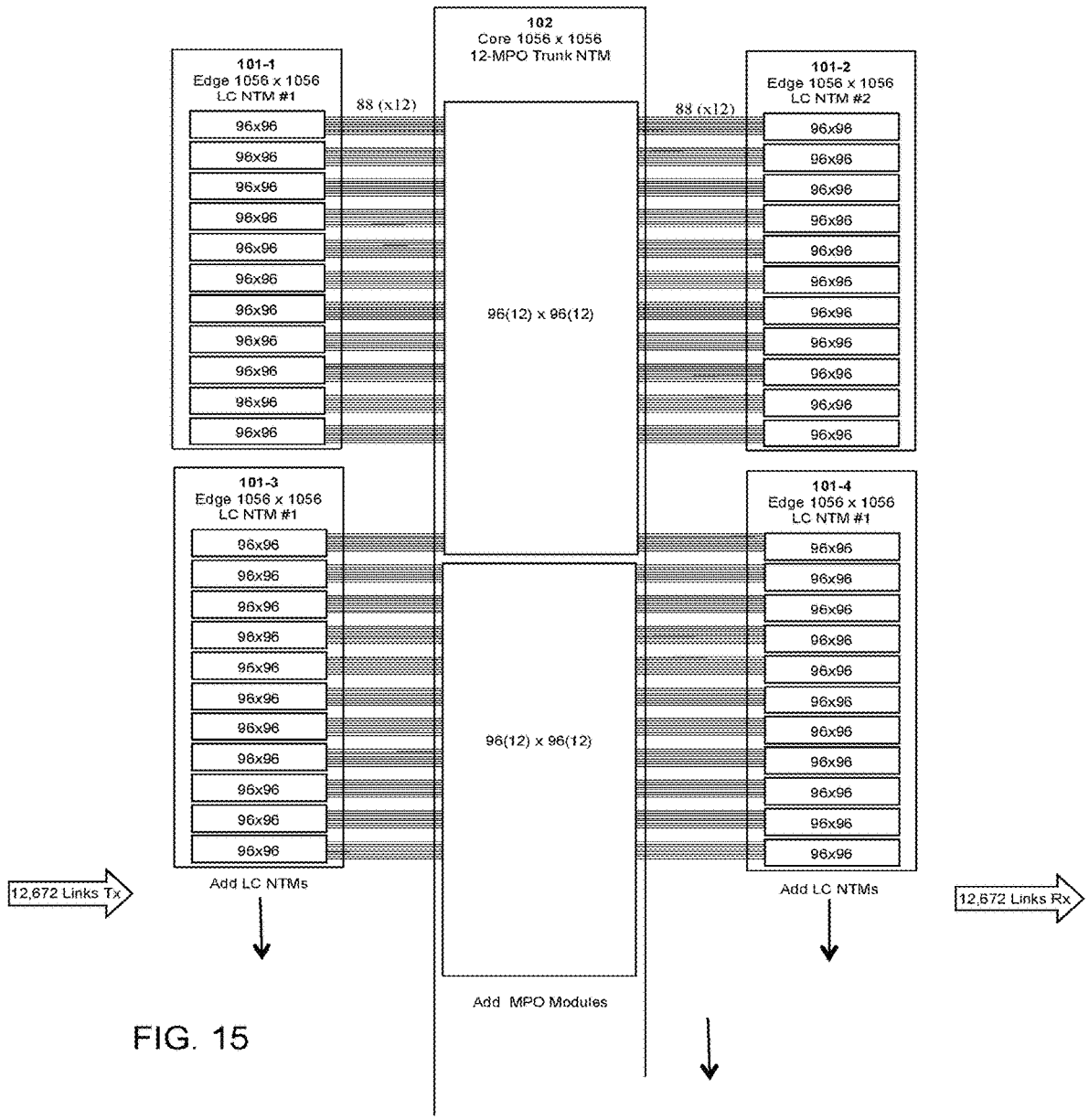
FIG. 15 illustrates in block diagram form the further extension of the example of FIGS. 11 to 12,672 links.

In contrast in FIG. 12, a TLM fiber module 105 comprises 96 trunk lines, with each trunk line consisting of twelve (12) separate fibers as a set, for a total of 1,132 fibers for the set. The TLM modules each include 96 twelve-fiber bundles, each bundle terminated in a single 12 fiber MPO connector. Therefore, the cumulative total can rise to 12,672×12,672 fibers as shown.

In accordance with exemplary embodiments hereof, the TLM thus functions as a multiplier of cross-connect ports while maintaining the desired non-blocking connectivity. For a TLM with 1,056 multi-fiber parts, the overall duplex or simplex port count is multiplied by the number of fibers per trunk line. For a system based on 12-fiber MPO connectors within the TLM, the port multiplier is twelve (12), for a 24-fiber MPO the port multiplier is twenty-four (24). A significant novel capability of this inventive concept is that trunk lines in the multi-fiber sets may be unassigned and thus held available until they are reserved by control system 100 to link a particular input and output NTM with a multi-fiber trunk line 111. The maximum number of unassigned and therefore potentially available ports may be defined as "reservation port overhead." For example, potentially up to eleven fibers of a 12-fiber trunk line 111 may initially be unassigned. The edge NTMs reserve TLM trunk lines to other edge NTMs in 12-fiber increments, even if only one (1) fiber is needed initially. Therefore, the maximum number of reserved but potentially unused fibers in the trunk lines due to the discrete nature of 12-fiber trunks, totals eleven unutilized fibers per trunk, multiplied by eleven underutilized trunks per system, and multiplied by eleven systems. This totals 1,452 potentially unused but reserved fibers out of the total 12,672. By limiting the number of edge links to the total number of links minus the reservation overhead (11,220 links in this particular example), the trunk link reservation approach ensures arbitrary, any- to-any non-blocking interconnections. In this case the trunk reservation blocking probability is nil.

FIG. 3 is only one example of applicant's massively scalable cross-connect, providing from 96 to 12,672 non-blocking links. The core TLM manages 12 fiber trunk lines between the edge NTMs and provides first non-blocking connections. Expandability is an advantageous further feature, moreover, because the 96 (23-fiber trunk)×96 (12 fiber trunk) modules are added incrementally to the core TLM as additional trunk lines and edge NTMs are deployed. This cross connect system is incrementally scalable.

The robotic cross-connect systems 110 disclosed in exemplary embodiments hereof provide low loss, software-defined fiber optic connections between an extremely large number of pairs of ports 108, 109. The system consists of a central or core cross-connect 102 in which trunk lines 111, including internal switchable segments 203, connecting opposing cross-connect switches 101-n, 103-n, are reserved in blocks of twelve fibers. The core NTM 102 is connected to a number of edge cross-connects 101, 103 that can arbitrarily reconfigure up to 1056 individual LC fiber ports. The number of ports of the scalable arrangement 110 ranges from 48×48 up to 12,672×12,672 and beyond. The core cross-connect 102 serves as a port multiplier to achieve ever increasing port counts in an incremental, redundant, non-blocking fashion. The port multiplication factor is directly related to the number of individual optical fibers 38 grouped into a trunk line 111. The core 102 and edge 101, 103 cross-connects operate by identical KBS principles. The core reconfigures trunk lines 111 with switchable segment 203 terminated in 12-fiber MPO connectors 204, while the edge 101, 103 reconfigures individual, single fibers 112 with moveable LC connectors 113 for full cross-connect flexibility without blocking. The process of internal connector 204 transport to a destination mating adapter 113 in both implementations includes a coordinated, sequential, multi-step movement of one or more robots 300 each transporting a gripper 205 within a high density of surrounding, suspended interconnects 203, and programmatic shuffling of each connector row 202 in accordance with the KBS algorithm as described in U.S. Pat. No. 8,463,091 referenced above. Before the robot plugs in the internal LC or MPO fiber connector 204 to its chosen final port 208, the polished fiber end face of fiber connector may be cleaned by an automated fiber end face cleaning module. The MPO 12-fiber connector 204 terminates the internal bundle 203 of twelve optical fibers, wherein each set of optical fibers 38 originate from an individual automatic, spring loaded take-up reel buffer assembly 120 residing on a tray comprised of multiple closely spaced take-up reels. The take-up reels ensure that all internal optical fiber bundles are maintained under slight tension in the fiber interconnect volume between the MPO connectors and the take-up reels, so that they follow substantially straight-line paths for all possible arrangements of connectors within ports.

Figure 10:
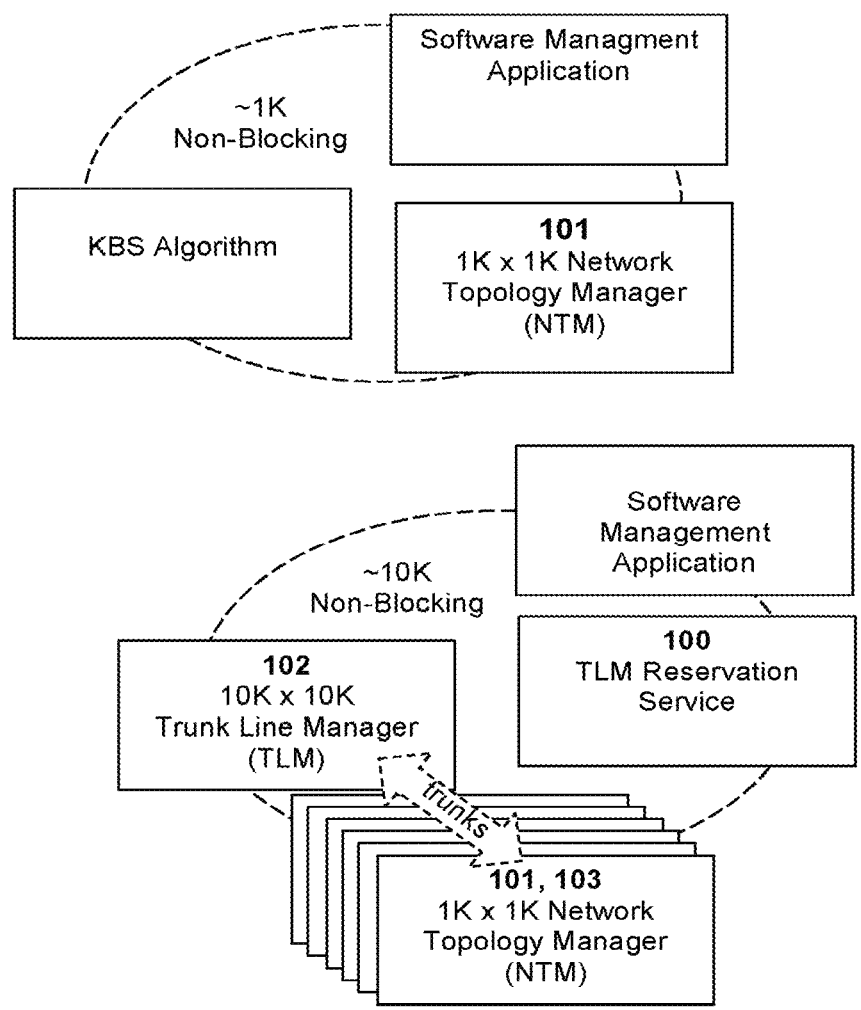
FIG. 10 illustrates aspects of system in accordance with exemplary embodiments.
Figure 11:
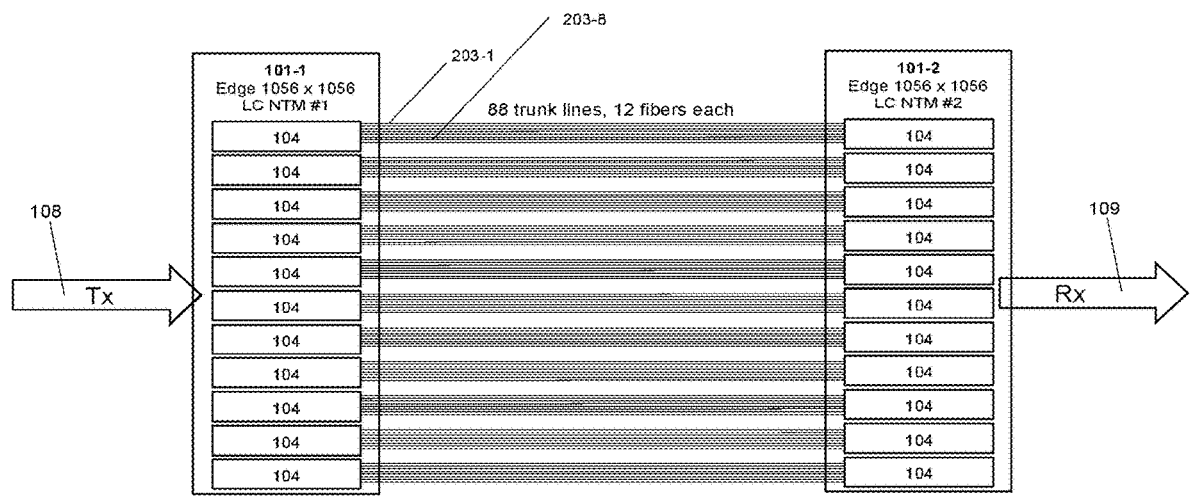
FIG. 11 illustrates a system in accordance with exemplary embodiments hereof in which a redundant cross-connect provides 96 to 1,056 links, non-blocking, without a core NTM.

This invention advances the state-of-the-art in non-blocking automated cross-connects from 1,000 links to greater than 10,000 software reconfigurable physical links as shown in block diagram form in FIG. 10. This incrementally scalable system of high performance automated optical links 110 consists of multiple NTMs 101, 103 interconnected by a single core TLM system 102 and orchestrated by the software/system 100. The TLM manages blocks of multi-fiber trunk lines 111,203 terminated in switchable MPO connectors 204 as shown in FIG. 2 and forms a programmable interconnection fabric connecting the intermediate links 106, 107 between NTMs. Trunk lines spanning NTMs are reserved by the TLM management system 102 to provision contiguous blocks of, say, twelve connections at a time, so that strict non-blocking scalability is achievable for 11,220×11,220 optical links in a system comprised overall of 12,672×16,672 optical fibers. FIG. 1 illustrates the block diagram of this system, including a TLM with over 1000 individual 12-fiber MPO ports.

In a further example specific to the twelve-fiber trunk line arrangement, twelve-fiber trunk lines 203 comprising the TLM provide the programmable, non- blocking fabric connecting inputs and outputs without being constrained by "blocking" or connectivity restrictions. While this system is inherently bi-directional, for typical duplex links using dual fibers, the transmit (Tx) fibers 108 are connected to the inputs and the receive (Rx) fibers 109 are connected to the outputs. The optical lines of the TLM 102 are reserved by the software in blocks of twelve-fibers. The TLM can connect two up to twenty-four NTMs (incrementally scalable) and each NTM can arbitrarily reconfigure up to 1,056 individual LC fiber ports.

In accordance with exemplary embodiments hereof, the TLM and NTMs operate by identical mathematical principles. The KBS algorithm is independent of whether the strand is physically a single or multi-fiber strand. The only requirement is that each strand follows a straight line in the interconnect volume where the cross-connections are actuated and managed. The TLM 102 at the core reconfigures trunk lines 111 terminated in multi-fiber (i.e., 12, 24, 36, 48) MPO connectors 204, for example, while the NTMs at the edge reconfigure individual, single fiber LC connectors 113. The internal connector gripper transport in both the TLM and NTM includes a coordinated, sequential, multi-step movement of the robot and programmatic shuffling of each connector row (as described in U.S. Pat. No. 8,463,091). However, the TLM and NTM are different with respect to their hardware implementation. In the TLM, an MPO multi-fiber connector 204 terminates an internal bundle of multiple optical fibers 203 and each set of optical fibers originates from a single spring-loaded take-up reel arranged on a flat tray comprised of multiple take-up reels. The take-up reel/fiber buffer 112 maintains tension of the fiber bundle between the MPO connectors and the take-up reels, ensuring the bundles follow straight-line paths for all possible configurations, which is necessary to ensure no physical entanglement of the bundles.

Link Reconfiguration Process with Multi-Fiber Trunk Reservation

The process of establishing a new physical connection in this system of NTMs/TLM consists of the following steps:
1. Specify input port and output port of new link
2. Determine corresponding Input Edge NTM 101-i and Output Edge NTM 103-j
3. Determine if an unused fiber is available on existing, reserved trunk line 111 between Input Edge NTM and Output Edge NTM. If none are available, first provision and reserve a new multi-fiber trunk line 111 between the Edge NTMs using the Core TLM 102.
4. Select a fiber within trunk line 111 whose connectivity at Edge NTMs can be switched most rapidly
5. Perform cross-connect between Input Edge NTM and input trunk line 106
6. Perform cross-connect between Output Edge NTM and output trunk line 107
7. Upon completion, a low insertion loss optical link between selected input and port ports is established In a particular example shown in FIGS. 11 and 12 which highlights the modularity of this system, each NTM fiber module 104 consists of ninety-six individual fibers terminated at both ends with LC connectors. In contrast, each TLM fiber module 105 consists of ninety-six trunk lines 111, with each trunk line consisting of twelve separate fibers reconfigured as a set, for a total of 1,152 fibers. Either or both fiber modules 104, 105 can be added incrementally in a non-service affecting manner to an existing, partially filled TLM system 102. Each TLM fiber module includes ninety-six twelve-fiber ribbons or trunk lines, each ribbon terminated with twelve-fiber MPO connectors 204. As the network scales, up to twenty-four NTMs can be individually and incrementally connected to the central TLM, twelve on the input side (101-1 . . . 101-12) and twelve on the output side (103-1 ... 103-12). NTMs may be distributed across the data center and their trunk lines may be run back to the central TLM.

The TLM increases the number of non-blocking cross-connect ports and forms a highly scalable switch matrix. For a TLM with 1,056 multi-fiber ports, the overall duplex or simplex port count for the system of NTMs is multiplied by the number of fibers per trunk line. For a system based on twelve-fiber MPO connectors within the TLM, the port multiplier is twelve, for twenty-fiber MPO the port multiplier is twenty-four. In exemplary embodiments hereof, the term "reservation port overhead" is defined. The overhead refers to the maximum number of potentially unavailable ports due to the reservation of partially filled trunk lines. For example, potentially one to eleven fibers of a twelve-fiber trunk line may be unassigned. The reservation port overhead for various configurations are presented in Table 1.

In a particular example in which trunk lines are in twelve fiber groupings, which is ideal in terms of keeping reservation overhead below 11.5%, the edge NTMs 101, 103 reserve TLM 102 trunk lines 111 to other edge NTMs in twelve fiber increments, even if only one fiber is needed initially. Therefore, the maximum number of reserved by potentially unused fibers in the trunk lines, due to the discrete nature of twelve-fiber trunks, totals eleven unutilized fibers per trunk, multiplied by eleven underutilized trunks per system, and multiplied by eleven systems. This totals 1,452 potentially unused but reserved fibers out of the total 12,672. By limiting the number of edge links to the total number of links minus the reservation overhead, the trunk link reservation approach ensures arbitrary, any-to-any non-blocking interconnections. In this case the trunk reservation blocking probability is null.

Incremental Scaling by 96 Ports

In a particular example shown in FIGS. 11 and 12, each fiber module 104 within the 1,056-port core cross-connect (101 or 103) is a 96×96 port device. Each module supports 96 ports of twelve fiber cable assemblies. The fiber modules can be added incrementally in a non-service affecting manner to an existing, partially filled cross-connect system Each module includes potentially eight ribbon fibers or fiber bundles terminated with twelve fiber MPO connectors on one side, and 96 individual LC ports on the opposite side.

In a further example, each fiber module 105 within the 1,056-port core cross-connect 102 consists of 96 trunk lines, each trunk line consisting of twelve bundled fibers. The fiber modules 105 can be added incrementally in a non-service affecting manner to an existing, partially filled core cross-connect system 102. Each module includes potentially 96 twelve fiber bundles, each bundle terminated with a 12-fiber MPO connectors on both ends.

Incremental Scaling by 1,056 Ports

In a further example, each edge cross-connect 101, 103 is comprised of 1056 links and each block of 1,056 ports can be added in redundant pairs by connecting each of the twelve fiber cables, terminated in MPO connectors, directly to the MPO core cross-connect. Edge cross-connect systems totaling up to 24 can be added incrementally in a non-service affecting manner.

In accordance with exemplary embodiments hereof, the core cross-connect 102 serves as a port multiplier by utilizing a multi-fiber trunk line reservation approach. For a core cross-connect with 1,056 multi-fiber ports, the overall duplex or simplex port count for the system of multiple 1,056 single fiber ports can be multiplied by the number of fibers per trunk line. For a system based on 12-fiber MPO

TABLE 1

| No. Links per Edge NTM | No. Links per Core NTM | No. Edge NTMs | No. Fibers per Trunk | Max No. of reserveed links | No. of Links | No. of Links (minus reservation overhead) | Trunk Reservation Overhead | Minimum Link Availability |
|---|---|---|---|---|---|---|---|---|
| 1,056 | 1,056 | 2 | 2 | 2 | 2,112 | 2,110 | 0.1% | 99.9% |
| 1,056 | 1,056 | 4 | 4 | 36 | 4,224 | 4,188 | 0.9% | 99.1% |
| 1,056 | 1,056 | 6 | 6 | 150 | 6,336 | 6,186 | 2.4% | 97.6% |
| 1,056 | 1,056 | 6 | 6 | 150 | 6,336 | 6,186 | 2.4% | 97.6% |
| 1,056 | 1,056 | 12 | 12 | 1,452 | 12,672 | 11,220 | 11.5% | 88.5% |
| 1,056 | 1,056 | 24 | 24 | 12,696 | 25,344 | 12,648 | 50.1% | 49.9% |
| 1,056 | 2,112 | 24 | 24 | 6,348 | 50,688 | 44,340 | 12.5% | 87.5% |
| 2,112 | 2,112 | 6 | 6 | 150 | 12,672 | 12,522 | 1.2% | 98.8% |
| 2,112 | 2,112 | 12 | 12 | 1,452 | 25,344 | 23,892 | 5.7% | 94.3% |
| 2,112 | 2,112 | 24 | 24 | 12,696 | 50,688 | 37,992 | 25.0% | 75.0% |
| 2,112 | 2,112 | 36 | 36 | 44,100 | 76,032 | 31,932 | 58.0% | 42.0% |

In a further example, Table 1 above presents scaling options based on the number of links per NTM as well as the number of fibers 38 per trunk line 111. The maximum number of reserved links relates to how many reserved but unused fibers within the trunk lines are possible under worst-case conditions. This reduces the number of ports available for cross-connection. The rightmost column entitled "Minimum Link Availability" describes the minimum fraction of links able to be arbitrarily cross-connected under various system configurations. Note that it may not be desirable in some cases to increase the number of fibers per trunk to 24, 36 or 48, because the reservation overhead (column 8 in Table 1) can increase significantly and negatively impact the system scalability. In general, it is preferred to minimize the reservation overhead and maximize the minimum link availability.

connectors, the port multiplier is 12, for 24-fiber MPO the port multiplier is 24, for 36-fiber MPO the port multiplier is 36 and for 48 fiber MPO the port multiplier is 48, corresponding to 48,384 ports. Port overhead refers to the maximum number of potentially unavailable ports due to the reserving of partially filled trunk lines and the potential for 1 to 11 fibers of a trunk line to be unassigned.

1:1 Redundancy

Each LC edge cross-connect 101, 103 with trunk lines 111 therebetween forms a pair of cross-connects with a potentially redundant pair of robots 300. This pair of devices can be reconfigured at both ends by any one of two edge cross-connects 101, 103, each edge cross-connect having its own robot 300.

Fast Execution of Cross-Connects

Figure 7:
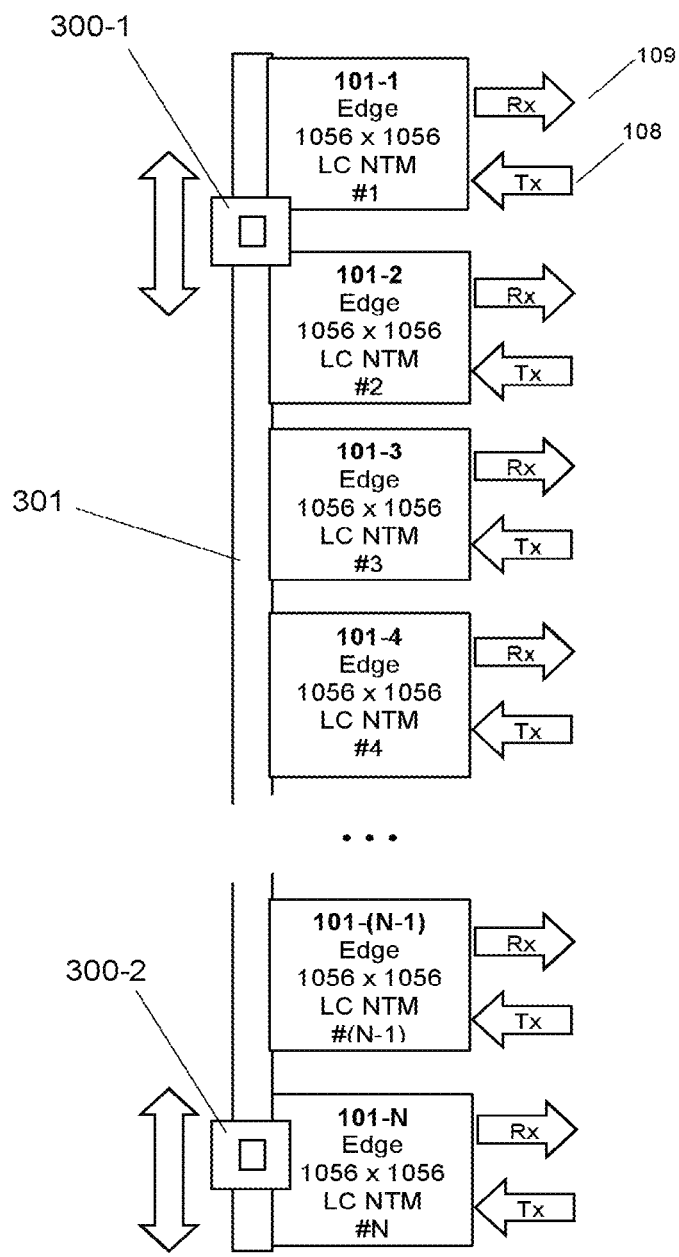
FIG. 7 is a block diagram of a portion of an aisle of adjacent NTMs wherein all NTMs are joined by a common robotic platform with one or more robotic modules traveling upon a common track connecting and spanning multiple cross-connect bays.

Multiple robots 300 in multiple edge cross-connects 101 can execute reconfigurations in parallel (FIG. 7). For the 12,672-port system, 12 robots can cross-connect 12 different connections simultaneously. Each cross-connect typically takes 1 minute to execute, so this enables the average cross-connect time to be reduced to 5 seconds. As shown in FIG. 7, the one or more robots operating in parallel can travel up and down an aisle on a common track 301 to reconfigure multiple NTMs 101 in parallel.

interior. The minimum outer diameter of a close-packed 12-fiber bundle comprised of reduced cladding (RC) optical fiber is about 4×0.165 mm=0.66 mm and this can fit within a 1.5 mm outer diameter sleeve. If ribbon fiber is used, the individual fibers must first be singulated along the length to be bundled by using the Corning Inc. ribbon splitting tool RST-000, for example.

TABLE 2

| No. Links per Edge NTM | No. Links per Core NTM | No. Edge NTMs | No. Fibers per Trunk | Max No. of reserved links | No. of Links | No. of Links (minus reservation overhead) | Trunk Reservation Overhead | Minimum Link Availability |
|---|---|---|---|---|---|---|---|---|
| 1,056 | 1,056 | 1 | 12 | 0 | 1,056 | 1,056 | 0.0% | 100.0% |
| 1,056 | 1,056 | 2 | 12 | 12 | 2,112 | 2,100 | 0.6% | 99.4% |
| 1,056 | 1,056 | 3 | 12 | 48 | 3,168 | 3,120 | 1.5% | 98.5% |
| 1,056 | 1,056 | 4 | 12 | 108 | 4,224 | 4,116 | 2.6% | 97.4% |
| 1,056 | 1,056 | 5 | 12 | 192 | 5,280 | 5,088 | 3.6% | 96.4% |
| 1,056 | 1,056 | 6 | 12 | 300 | 6,336 | 6,036 | 4.7% | 95.3% |
| 1,056 | 1,056 | 7 | 12 | 432 | 7,392 | 6,960 | 5.8% | 94.2% |
| 1,056 | 1,056 | 8 | 12 | 588 | 8,448 | 7,860 | 7.0% | 93.0% |
| 1,056 | 1,056 | 9 | 12 | 768 | 9,504 | 8,736 | 8.1% | 91.9% |
| 1,056 | 1,056 | 10 | 12 | 972 | 10,560 | 9,588 | 9.2% | 90.8% |
| 1,056 | 1,056 | 11 | 12 | 1,200 | 11,616 | 10,416 | 10.3% | 89.7% |
| 1,056 | 1,056 | 12 | 12 | 1,452 | 12,572 | 11,120 | 11.5% | 88.5% |

Robotic Gripper for MPO Connections

Figure 5:
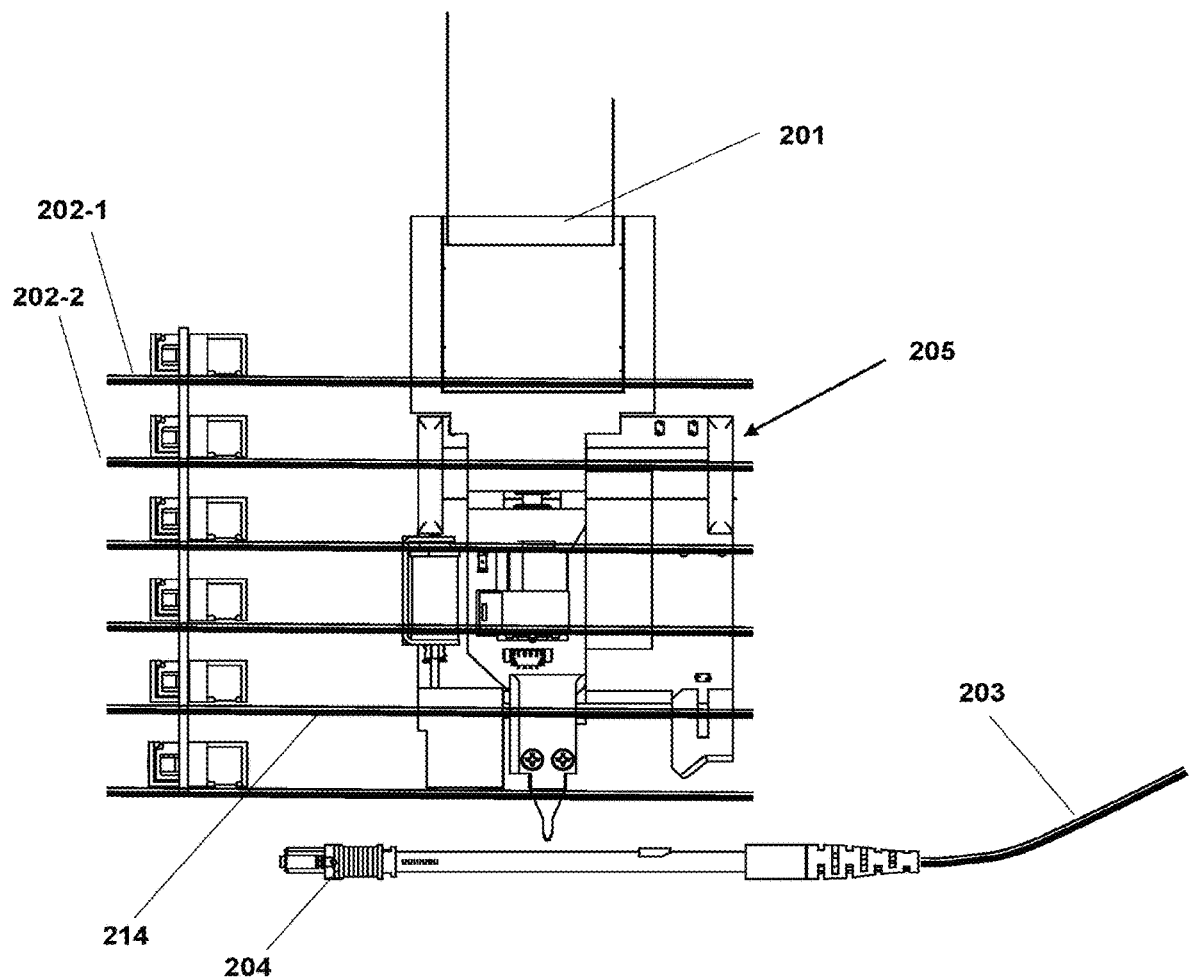
FIG. 5 is an elevation view of a robotic gripper device as positioned in relation to multiple stacked rows of MPO (Mechanical Pull Out) connector receptacles.
Figure 6:
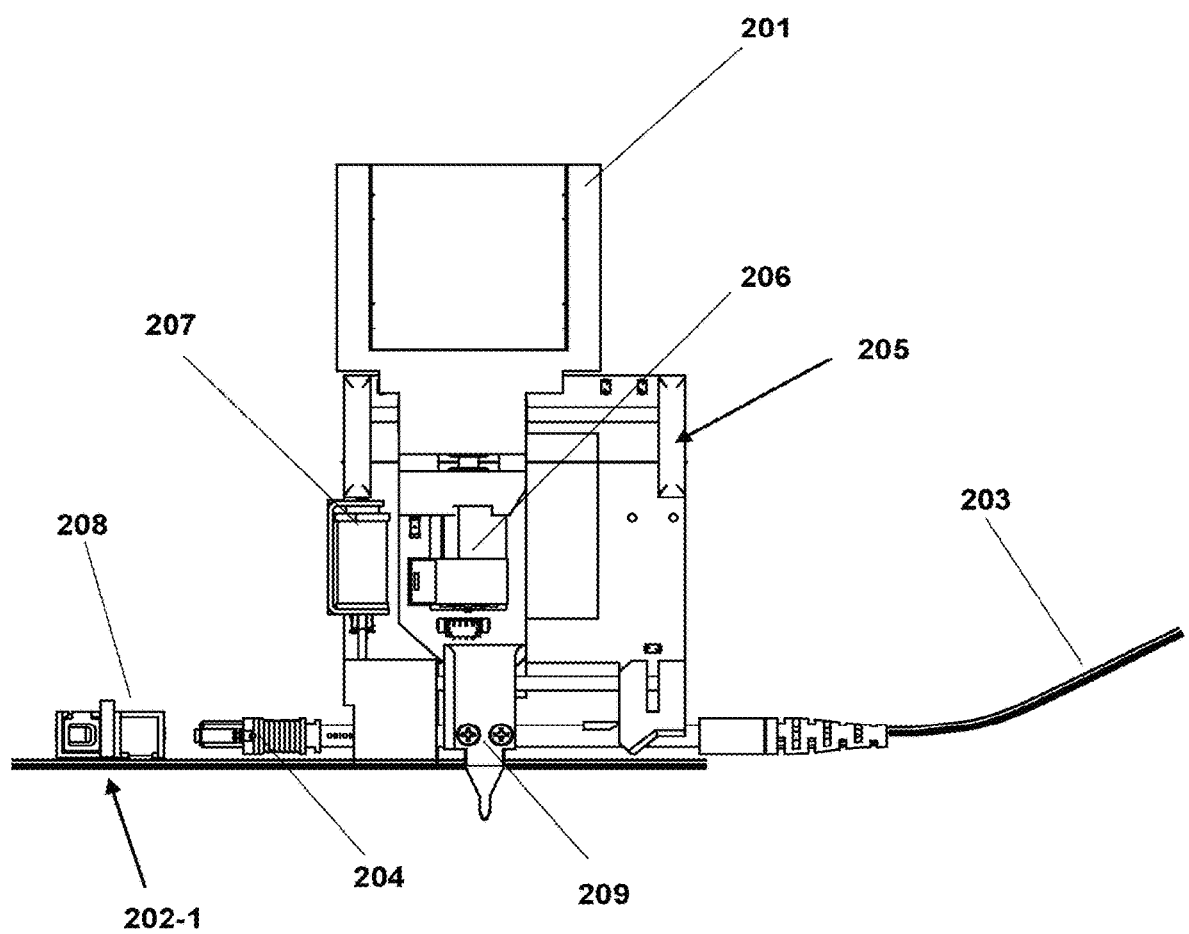
FIG. 6 is a second elevation view of the gripper device shown in FIG. 5 showing further features thereof.

A gripper 205 attached to the end of robotic arm 201 (FIGS. 5-6) engages and disengages an internal female MPO connector 204 terminating the miniature fiber bundle 203 to plug it in or unplug it from an internal MPO receptacle 208 on the moveable row 202. The industry standard MPO connector uses a push-pull latching action and MPO stands for "Mechanical Pull Out" in the art. The gripper produces the plug/unplug actuation force by use of a miniature stepper motor 206. A compact solenoid 207 is used to lock the MPO connector 204 into the gripper 205. In a particular example, the MPO connector 204 further includes a permanent magnet with an attraction force of at least 5 N to an additional permanent magnet(s) attached to each connector track 210 for the purpose of retaining connector 204 within connector receptacle 208 and providing the fiber end face contact force necessary to maintain low insertion loss MPO connections.

Row of MPO Connections

Figure 8:
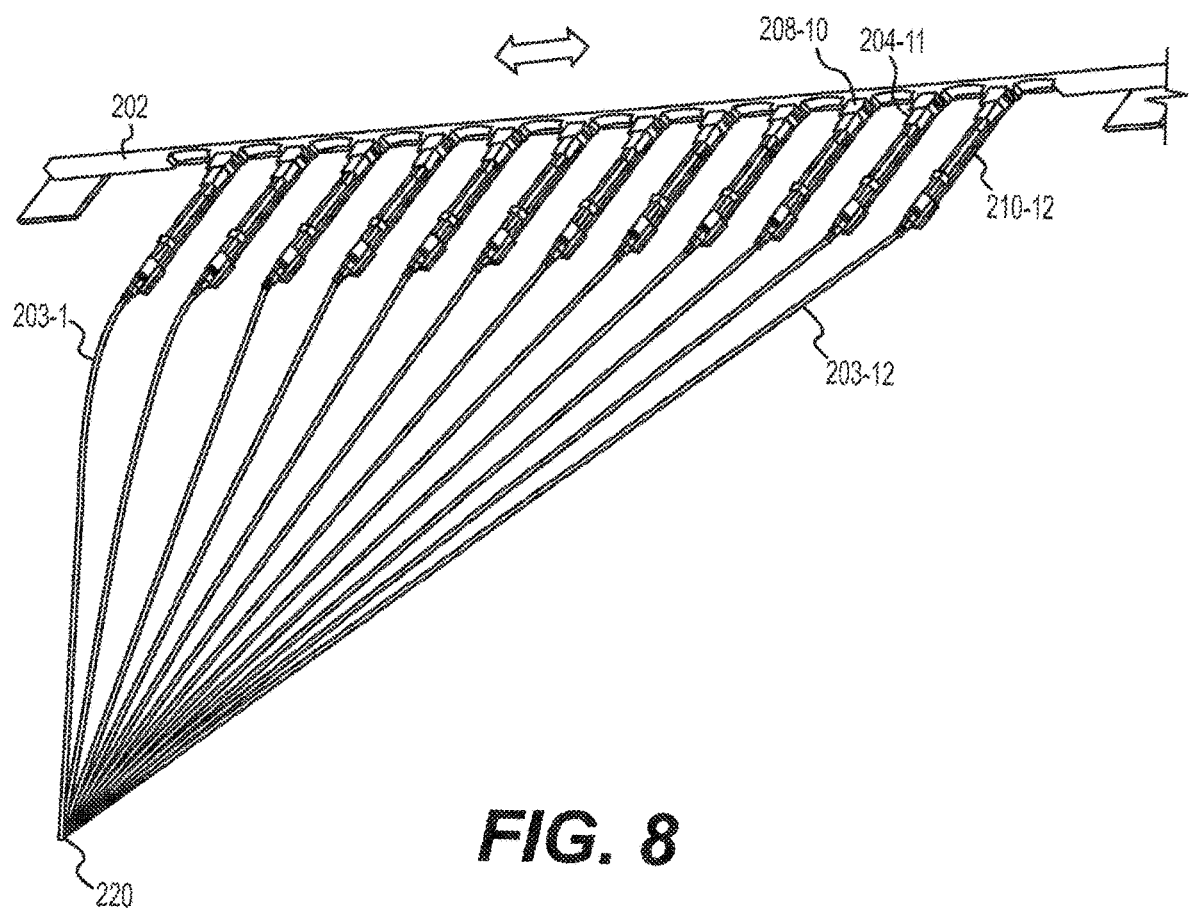
FIG. 8 is a perspective view of one of a stacked multiplicity of transversely activated rows, each row having multiple connector receptacles and corresponding linear tracks joining and spanning multiple cross-connect bays, and multiple 12-fiber bundles converging at a one-dimensional backbone.
Figure 9:
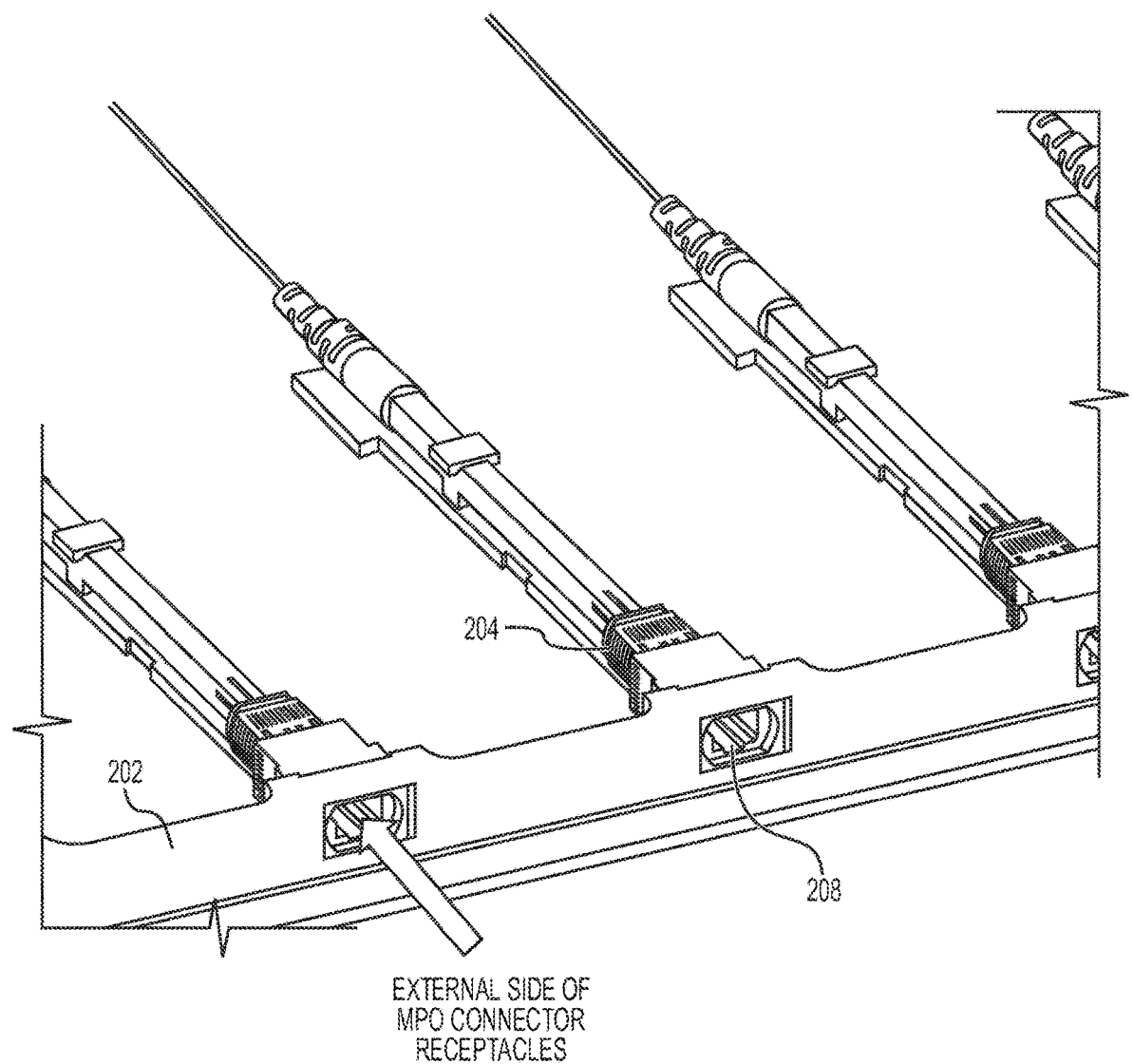
FIG. 9 is a fragmentary perspective view of a portion of the MPO cross-connect system, showing details as to the cable ports, the MPO connector receptacles, and the translating connector receptacles.

MPO connectors 204 terminating multi-fiber bundles 203 plug into independently translatable rows 202 of connector receptacles 208 (FIG. 8). The alignment features of the gripper 205 latch onto and register with a particular connector track 210 to align with its corresponding connector receptacle 208. In a further example, a permanent magnet is affixed to distal end of track 210 to attract a corresponding magnet at the distal end of MPO connector body 204.

Reels for Ribbon Fiber

Examples of retractable fiber reels in which continuous lengths of fiber are packaged in a spring-loaded reel are disclosed in U.S. Pat. No. 7,315,681. In a particular example, the small diameter bundle is converted to a 12-fiber ribbon within the reel, which is about 3.0 mm tall and is interleaved along the spiral path defined by a coiled spring element. The coiled spring element is ideally 0.125 to 0.250 mm thick, 3.0 mm tall spring steel.

Backbone for 12-Fiber Bundle in Protective Strain Relief Tube with Dense 1 mm Spacing Plastic tubing that is sufficiently flexible and low friction is applied to the fiber bundle as a protective sleeve 34. In a particular example, the tubing and optical fiber bundle therein can pass through a backbone array of flexible tubes to manage the bend radius of the fiber bundle within its Port Scaling via Multi-Fiber Trunk Line Reservation System Managed by a Central, Multi-Fiber Core Cross-Connect The maximum number of reserved but potentially unused fibers in the trunk lines 111, due to the discrete nature of twelve fiber trunks joining the edge cross-connects 101, 103 to the core cross-connect 102, totals eleven unutilized fibers per truck, eleven underutilized trunks per system, trunks to eleven other cross-connects=1,331 fibers out of the total 12,096. The edge NTMs reserve trunk lines of the core cross-connect in twelve fiber increments, even if only one fiber is needed initially. This potentially leaves eleven unused fibers per trunk, reserved for later provisioning.

Table 2 presents different scaling options based on the number of links per NTM 101 as well as the number of fibers per trunk link 111 and presents the trunk reservation overhead for 12 fibers per trunk line, as the number of fibers is scaled incrementally from 1,056 to 12,672. As trunk lines are reserved, potentially only one fiber within the multiple fiber trunk line is utilized. The maximum number of reserved links relates to how many reserved but unused fibers within the trunk lines are possible under worst-case conditions. This reduces the number of ports able to be cross-connected by an overhead factor. The rightmost column in Table 2, entitled "Minimum Link Availability", describes the fraction of links 111 able to be arbitrarily cross-connected under various system configurations. The trunk link reservation approach does not degrade the non-blocking characteristic of the cross-connect system. The cross-connect system continues to support arbitrary, any-to-any non-blocking interconnections throughout the scaling process.

CONCLUSION

As used herein, including in the claims, the phrase "using" means "using at least," and is not exclusive. Thus, e.g., the phrase "using Z" means "using at least Z." Unless specifically stated by use of the word "only", the phrase "using Z" does not mean "using only Z."

In general, as used herein, including in the claims, unless the word "only" is specifically used in a phrase, it should not be read into that phrase.

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and / or identify, and not to show any serial or numerical limitation or ordering.

As used herein, including in the claims, singular forms of terms are to be construed as also including the plural form and vice versa, unless the context indicates otherwise. Thus, it should be noted that as used herein, the singular forms "a," "an," and "the" include plural references unless the context clearly dictates otherwise.

Throughout the description and claims, the terms "comprise", "including", "having", and "contain" and their variations should be understood as meaning "including but not limited to", and are not intended to exclude other components unless specifically so stated.

It will be appreciated that variations to the embodiments of the invention can be made while still falling within the scope of the invention. Alternative features serving the same, equivalent or similar purpose can replace features disclosed in the specification, unless stated otherwise. Thus, unless stated otherwise, each feature disclosed represents one example of a generic series of equivalent or similar features.

The present invention also covers the exact terms, features, values and ranges, etc. in case these terms, features, values and ranges etc. are used in conjunction with terms such as about, around, generally, substantially, essentially, at least etc. (i.e., "about 3" shall also cover exactly 3 or "substantially constant" shall also cover exactly constant).

As used herein, including in the claims, unless stated otherwise, ranges include their end values. Thus, e.g., a value in the range 2 to 12 includes the values 2 and 12. As another example, a number in the range 48 to 1,056 could be 48 or 1,056.

Use of exemplary language, such as "for instance", "such as", "for example" ("e.g.,") and the like, is merely intended to better illustrate the invention and does not indicate a limitation on the scope of the invention unless specifically so claimed.

Those skilled in the art will readily observe that numerous modifications and alterations of the systems may be made while retaining the teachings of the invention. Accordingly, the above disclosure should be construed as limited only by the metes and bounds of the appended claims.

LEGEND

34: Compliant sleeve
38: Individual fiber within internal trunk bundle
100: Trunk line reservation system
101: Edge cross-connects for single fiber link, input
102: Core cross-connects for multi-fiber links
103: Edge cross-connects for single fiber link, output
104: 96-port fiber module, simplex
105: 96-port fiber module, multiple fiber (e.g. 12 per connection)
1.0 106: Input edge to core fiber trunk line
107: Core to output edge fiber trunk line
108: Input fiber optic cables
109: Output fiber optic cables
110: Large scale cross-connect system
111: Multi-fiber trunk line
112: Internal fiber buffer
113: Input receptacle
114: Output receptacle
201: Base of robot telescopic arm
202: Row of MPO connector receptacles
203: Reduced diameter internal core fiber trunk line
204: MPO connector
205: Gripper
206: Stepper motor
207: Solenoid latch
208: Input MPO connector receptacle
209: Output MPO connector receptacle
210: Connector track
220: One dimensional internal backbone
300: Reconfiguration robot
301: Track for multiple reconfiguration robot configuration

I claim:

1. An optical fiber signal distribution system which transfer signals via groups of fibers, a group being moveable as a unit with respect to other groups, comprising:
    an elongated bar spanning a number of signal junction locations spaced apart along the bar, each junction location including a female receptacle facing on a first side thereof and a coupling to an external circuit on the opposite side thereof;
    a changeable number of elongated signal terminals removably engaged in individual ones of the signal junctions in the female receptacles therein, each signal terminal having a length of less than 10 cm and a transverse width of less than 20 mm, and encompassing a number of optical fibers within a flexible sleeve, the fibers extending away from the elongated bar to signal input sources; and
    a plurality of support elements individually coupled to the elongated bar in individual alignment and adjacency to the signal terminals and extending along at least a majority of the length of the signal terminals.

2. The system of claim 1, wherein slide bars are mounted longitudinally on a frame and a stepper motor moves an engaged optical cable toward or away from a selected coupler in the elongated bar.

3. The system of claim 1, wherein a narrow thickness of support elements is in the range of 2 to 4 mm, and wherein the support elements are fabricated of fiberglass or carbon fiber laminate.

4. The system of claim 1, wherein the number of fibers within the flexible sleeve is 2 to 12, and wherein a length of individual fibers within the flexible sleeve is between 5 m and 10 m.

5. The system of claim 1, wherein the number of signal junction locations is in the range of 48 to 1,056, the number of elongated signal terminals is in the range of 48 to 1,056, and the number of fibers is 96 to 12,672.

6. The system of claim 5, wherein the number of groups of fibers is in the range of 48 to 1,056.

7. The system of claim 1, wherein fibers are each encased within individual protective coatings and the plurality further being enclosed in the flexible sleeve with an outer diameter of less than about 2 mm to form the group; and
    the elongated signal terminals being substantially rigid and further including a terminal male coupler constructed and adapted to insert a group of optical fibers into a corresponding mating female receptacle.

8. The system of claim 7, wherein the group comprises two to twelve fibers, wherein the flexible sleeve comprises a material with low coefficient of friction, and wherein the system further includes, in a coupling body adjacent the terminal male coupler end, an external magnet arrangement to retain housing within terminal male coupler.

9. An optical fiber terminal switching system for changing a location of a selected optical fiber in a two-dimensional distributed planar array of connector receptacles spaced apart in a two-dimensional grid of columns and rows to receive optical fibers from an entry side, the system comprising:
- a plurality of optical fiber lines, each encompassing a selected number of optical fibers in individual housings and each terminating in a length of rigid housing of limited diameter and length for engagement in a selected connector receptacle; and
- a fiber positioning system controllable in position and dimension to fit between the columns in the receptacle array on the entry side, said fiber positioning system including a fiber terminal housing, engagement mechanism responsive to control signals to selectively control the position of the optical fiber terminal housing in a chosen connector receptacle,
- wherein the fiber positioning system extends downwardly from the engagement mechanism and comprises:
- a laterally slidable frame mounted on the positioning system and slidable parallel to the optical fiber lines and mounted for insertion/retraction operation of the frame by the positioning system, wherein the slidable frame comprises a solenoid operated mechanism selectively engaging the terminal length of an optical fiber line to be received in a selected connector, and a motor constructed and adapted to increment the frame on shafts laterally to engage or disengage a selected optical fiber housing in a connector receptacle at that location.

10. The system of claim 9, wherein the laterally slidable frame is movable by the motor aver an insertion/removal distance to engage/disengage from a connector receptacle and wherein the inclusive housings of the plurality of optical fiber lines include an elongated, rigid structure terminating in a lateral face exposing end faces of the fibers therein.

11. The system of claim 9, further including a fiber end face cleaning module.

12. The system of claim 9, wherein incrementing the frame laterally occurs over a distance of 15 to 25 mm and the fiber terminal housing, engagement mechanism has a dimension of less than 15 mm.

13. The system of claim 9, wherein the motor comprises a stepper motor.

14. The system of claim 13, wherein the motor can produce a lateral force of at least 5 N when connecting or disconnecting fiber terminal housing.

15. The system of claim 9, wherein the fiber terminal housing engagement mechanism is readily removeable and replaceable from the fiber positioning system in a non-service affecting manner.

16. The system of claim 9, wherein the fiber positioning system is readily removeable and replaceable from the fiber terminal switching system in a non-service affecting manner.

* * * * *